US010755024B1

(12) United States Patent
Chow et al.

(10) Patent No.: US 10,755,024 B1
(45) Date of Patent: Aug. 25, 2020

(54) SYSTEM AND METHOD FOR ROUTING IN AN INTEGRATED CIRCUIT DESIGN

(71) Applicant: Cadence Design Systems, Inc., San Jose, CA (US)

(72) Inventors: Wing Kai Chow, Austin, TX (US); Mehmet Yildiz, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/148,182

(22) Filed: Oct. 1, 2018

(51) Int. Cl.
*G06F 30/394* (2020.01)
*G06F 30/327* (2020.01)
*G06F 111/20* (2020.01)
*G06F 111/04* (2020.01)

(52) U.S. Cl.
CPC .......... *G06F 30/394* (2020.01); *G06F 30/327* (2020.01); *G06F 2111/04* (2020.01); *G06F 2111/20* (2020.01)

(58) Field of Classification Search
CPC ............. G06F 17/5077; G06F 2217/08; G06F 2217/02; G06F 2217/06; G06F 30/394; G06F 30/327; G06F 2111/20; G06F 2111/04
See application file for complete search history.

(56) References Cited

U.S. PATENT DOCUMENTS

| 2011/0161901 | A1* | 6/2011 | Berry | G06F 17/5077 716/108 |
| 2013/0272126 | A1* | 10/2013 | Alpert | H04L 41/145 370/235 |
| 2014/0189632 | A1* | 7/2014 | Yu | G06F 17/5077 716/130 |
| 2015/0089465 | A1* | 3/2015 | Chang | G06F 17/5077 716/112 |
| 2019/0220569 | A1* | 7/2019 | Siddiqi | G06F 17/5077 |

* cited by examiner

*Primary Examiner* — Vuthe Siek
(74) *Attorney, Agent, or Firm* — Mark H. Whittenberger, Esq.; Holland & Knight LLP

(57) ABSTRACT

The present disclosure relates to a system and method for routing in an electronic circuit design. Embodiments may include providing, using a processor, a hierarchical electronic design having a plurality of partitions, at least one routing blockage, a source pin location, and one or more sink pin locations. Embodiments may also include generating a routing wire network configured to connect the source pin location and the one or more sink pin locations to create one or more segments, wherein generating the routing wire network includes creating two or more feed-through ports at one or more of the plurality of partitions. Embodiments may further include applying a maze-routing approach to each of the one or more segments of the routing wire network to form a routed net associated with the hierarchical electronic design.

17 Claims, 23 Drawing Sheets

1200

An example of grid cell and grid edge labels

An example of routing score

US 10,755,024 B1

SYSTEM AND METHOD FOR ROUTING IN AN INTEGRATED CIRCUIT DESIGN

TECHNICAL FIELD

The present disclosure relates to electronic design automation (EDA), and more specifically, to a system and method for routing in an integrated circuit design.

DISCUSSION OF THE RELATED ART

An integrated circuit (IC) comprises cells of similar and/or various sizes, and connections between or among the cells. A cell may include several pins interconnected by wires to pins of one or more other cells. A net may include a set of pins connected by wires in order to form connections between or among the pins. An IC may include a set of nets. A design netlist specifies the connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

Routing is a key operation in the physical design cycle. It is generally divided into two phases: global routing and detailed routing. For each net, global routing generates a routing topology that includes an approximate routing path for the interconnect lines that are to connect the pins of the net. After the routing topology has been created, detailed routing creates specific individual routes for each net.

Due to the large number of nets in the netlist, it typically takes a long time for conventional routers to finish the connection task. In addition, the connections may be too numerous and/or overcrowded, such that conventional routers fail to finish the routing, particularly generating interconnections, without violating one or more routing constraints (e.g., design-rule constraints and performance constraints). For example, a hierarchical IC design may include one or more partitions and a routing constraint that limits the routing path of nets in the design to only a single entry into each partition (e.g., a routing path may intersect with partition boundaries only once) to reduce design, device, and manufacturing costs. However, conventional routing methods are generally not partition aware, and as such, cannot guarantee a single-entry-violation-free routing result. In other words, the conventional routing methods result in routing topologies that may have multiple entries to a single partition thereby creating a violation to the single-entry constraint.

SUMMARY

In one or more embodiments of the present disclosure, a computer-implemented method for routing in an electronic circuit design is provided. The method may include providing, using a processor, a hierarchical electronic design having a plurality of partitions, at least one routing blockage, a source pin location, and one or more sink pin locations. The method may also include generating a routing wire network configured to connect the source pin location and the one or more sink pin locations to create one or more segments, wherein generating the routing wire network includes creating two or more feed-through ports at one or more of the plurality of partitions. The method may further include applying a maze-routing approach to each of the one or more segments of the routing wire network to form a routed net associated with the hierarchical electronic design.

One or more of the following features may be included. In some embodiments, the maze-routing approach may be configured to support both feed-through routing and single-entry routing. The method may include determining a logical wire segment associated with each of the plurality of partitions. The method may further include determining a feed-through wire segment connecting the two or more feed-through ports. The method may also include determining a wire segment hierarchy based upon, at least in part, the logical wire segment associated with each of the plurality of partitions and the feed-through wire segment connecting the two or more feed-through ports. The method may further include validating the maze-routing approach across a border of each of the plurality of partitions. The method may also include determining an appropriate placement for the two or more feed-through ports at one or more of the plurality of partitions.

In some embodiments, a computer-readable storage medium is provided. The computer-readable storage medium may have stored thereon instructions that when executed by a machine result in one or more operations. Operations may include providing, using a processor, an electronic design having one or more partitions, at least one routing blockage, a source pin location, and one or more sink pin locations. Operations may further include generating a routing wire network configured to connect the source pin location and the one or more sink pin locations to create one or more segments, wherein generating the routing wire network includes inserting at least one feed-through port at one or more of the plurality of partitions. Operations may also include applying a maze-routing procedure to each of the one or more segments of the routing wire network to form a routed net associated with the hierarchical electronic design, wherein the maze-routing approach includes a partition boundary crossing checking procedure and a wire merging checking procedure.

One or more of the following features may be included. In some embodiments, the maze-routing approach may be configured to support both feed-through routing and single-entry routing. Operations may include determining a logical wire segment associated with each of the plurality of partitions and a feed-through wire segment connecting the two or more feed-through ports. Operations may further include displaying the routing wire network at a graphical user interface. Operations may also include determining a wire segment hierarchy based upon, at least in part, the logical wire segment associated with each of the plurality of partitions and the feed-through wire segment connecting the two or more feed-through ports. Operations may also include validating the maze-routing approach across a border of each of the plurality of partitions. Operations may also include displaying, at the graphical user interface, the two or more feed-through ports at one or more of the plurality of partitions.

In some embodiments, a system for evaluating a routing is provided. The system may include a computing device having at least one processor configured to access a design netlist of an integrated circuit (IC) design, the design netlist identifying a multi-pin net and specifying connections between pins included in the multi-pin net, the IC design having two or more partitions. The at least one processor may be further configured to decompose, using the one or more hardware processors, the multi-pin net into a plurality of two-pin nets. The at least one processor may be configured to route each two-pin net of the plurality of two-pin nets, the routing of each two-pin net may include inserting at least one feed-through port at one or more of the plurality of partitions to generate a routing wire network.

One or more of the following features may be included. In some embodiments, the at least one processor may be further configured to apply a maze-routing procedure to each of the one or more segments of the routing wire network to form a routed net associated with the hierarchical electronic design. The maze-routing procedure may include analyzing one or more routing grid graphs. The at least one processor may be further configured to display the routing wire network at a graphical user interface. The at least one processor may be further configured to determine a wire segment hierarchy based upon, at least in part, one or more of the logical wire segment associated with each of the plurality of partitions and the feed-through wire segment connecting the two or more feed-through ports. The maze-routing approach may include a partition boundary crossing checking procedure and a wire merging checking procedure.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
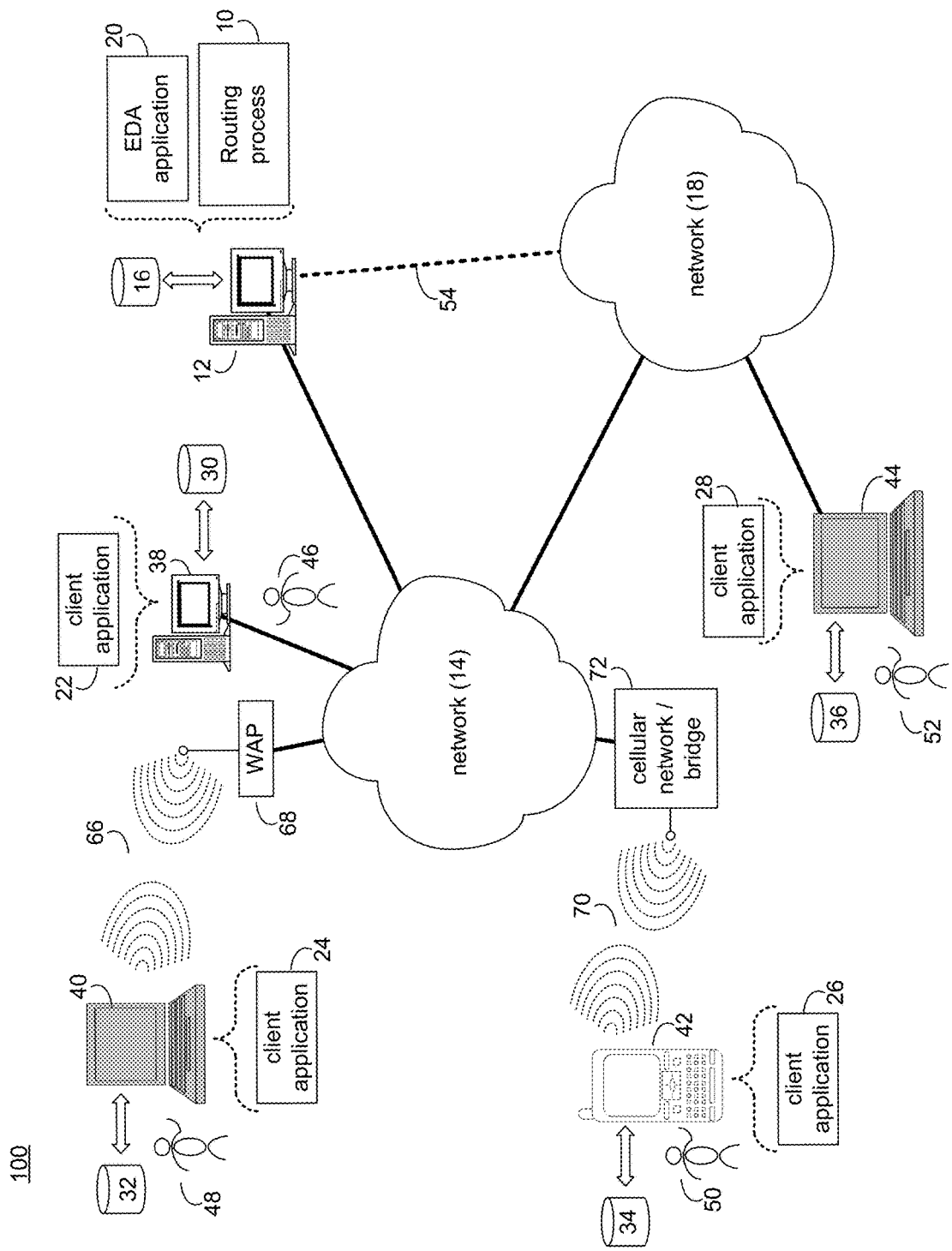
FIG. 1 is a system diagram depicting aspects of the routing process in accordance with an embodiment of the present disclosure.

Referring to FIG. 1, there is shown routing process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the routing process may reside on and be executed, in whole or in part, by a client electronic device, such as a personal computer, notebook computer, personal digital assistant, or the like.

The instruction sets and subroutines of routing process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Routing process 10 may be a stand-alone application, or may be an applet/application/script that may interact with and/or be executed within EDA application 20. In addition/as an alternative to being a server-side process, the routing process may be a client-side process (not shown) that may reside on a client electronic device (described below) and may interact with an EDA client application (e.g., one or more of EDA client applications 22, 24, 26, 28). Further, the routing process may be a hybrid server-side/client-side process that may interact with EDA application 20 and an EDA client application (e.g., one or more of client applications 22, 24, 26, 28). As such, the routing process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize routing process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to iOS™, ANDROID™, Microsoft Windows, Microsoft Windows CE®, Red Hat Linux, or other suitable operating system. (Windows CE is a registered trademark of Microsoft Corporation in the United States, other countries, or both).

Referring to FIGS. 2-12, various embodiments consistent with routing process 10 are provided. The method may include providing 202, using a processor, a hierarchical electronic design having a plurality of partitions, at least one routing blockage, a source pin location, and one or more sink pin locations. The method may also include generating 204 a routing wire network configured to connect the source pin location and the one or more sink pin locations to create one or more segments, wherein generating the routing wire network includes creating a feed-through port at one or more of the plurality of partitions. The method may further include applying 206 a maze-routing approach to each of the one or more segments of the routing wire network to form a routed net associated with the hierarchical electronic design. These and numerous other operations are also within the scope of the present disclosure as is discussed in further detail below.

In many instances, IC designs include a number of independently designed sub-circuits or subsystems known as "partitions" that are designed to speed up the design process by minimizing the number of interconnections. As used herein, these may be referred to as "blocks," "random logic macros," or simply as "macros." As noted above, hierarchical IC designs may include a routing constraint that limits the routing path of nets in the design to only a single entry into each partition (e.g., a routing path may intersect with partitions only once) to reduce design, device, and manufacturing costs. A partition entry, as used herein, may include an instance in which a routing path traverses (e.g., crosses) a partition boundary. Conventional routing methods are generally not partition aware, and as such, cannot guarantee a single-entry-violation-free routing result.

Accordingly, aspects of the present disclosure address systems and methods for resolving single entry constraints in IC designs. The system may include an entry-aware search algorithm based on a modified A* search algorithm to identify single-entry-violation-free routing results for two-pin nets. For example, given a hierarchical IC design as input, the system decomposes multi-pin nets in the design into two-pin nets. During the routing process, the system applies the entry-aware search algorithm to generate single-entry-violation-free routing results for each two-pin net. The search algorithm is "entry-aware" in that it penalizes multiple entries into a single partition (e.g., using an adjustment factor). The system assembles the multi-pin net by combining the routed two-pin nets to assemble the multi-pin net.

Although the individual two-pin nets are routed in a manner that does not violate the single-entry constraint, the single-entry constraint may be violated in the routed multi-pin net as a result of combining the two-pin nets. Accordingly, consistent with some embodiments, the system may utilize a post fix stage to remove extra entries for the multi-pin nets with single-entry violations by choosing a main entry to enter a partition and rerouting the paths that enter the partition at a location other than the main entry such that the paths share the main entry.

Figure 3:
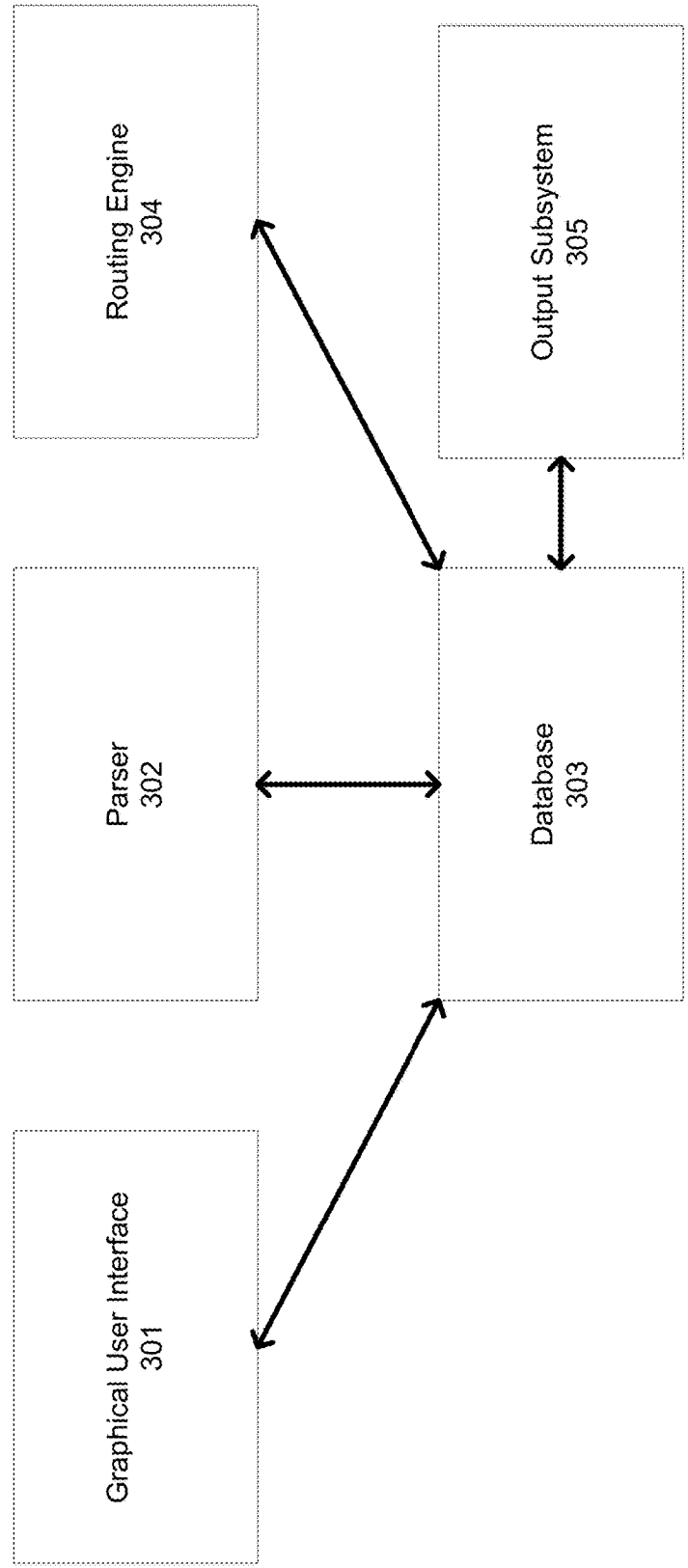
FIG. 3 is a block diagram of a router system consistent with the routing process of the present disclosure.

With reference to FIG. 3, a router 300 is illustrated, according to some example embodiments. The router 300 comprises a graphical user interface (GUI) 301, a parser 302, a database 303, a routing engine 304, and an output subsystem 305. Any one or more of the functional components illustrated in FIG. 3 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components.

Furthermore, according to various example embodiments, any of the functional components illustrated in FIG. 3 may be implemented together or separately within a single machine, database, or device or may be distributed across multiple machines, databases, or devices.

The GUI 301 is responsible for handling user interactions with the router 300. For example, the GUI 301 may allow a user to view wires generated by the router 300. The GUI 301 may also allow the user to view various information, such as routing tracks. The GUI 301 may also allow the user to interactively add and delete wires.

The parser 302 reads in IC design information stored in a format, such as an industry standard format and/or a custom format. The cells and connections are entirely or partly described in IC design information, After routing is complete, the generated wires will be output into the files as well. The database 303 stores the IC design information as well as wires in a compact and efficient manner. The database 303 may, for example, reside on a computer-readable storage device such as a computer memory or a hard drive. The routing engine 304 generates wires (which are then stored in the database 303) that interconnect the nets of an IC design in accordance with the netlist of the IC design. The output subsystem 305 outputs the wiring and other useful information into files of a standard and/or custom format.

Figure 4:
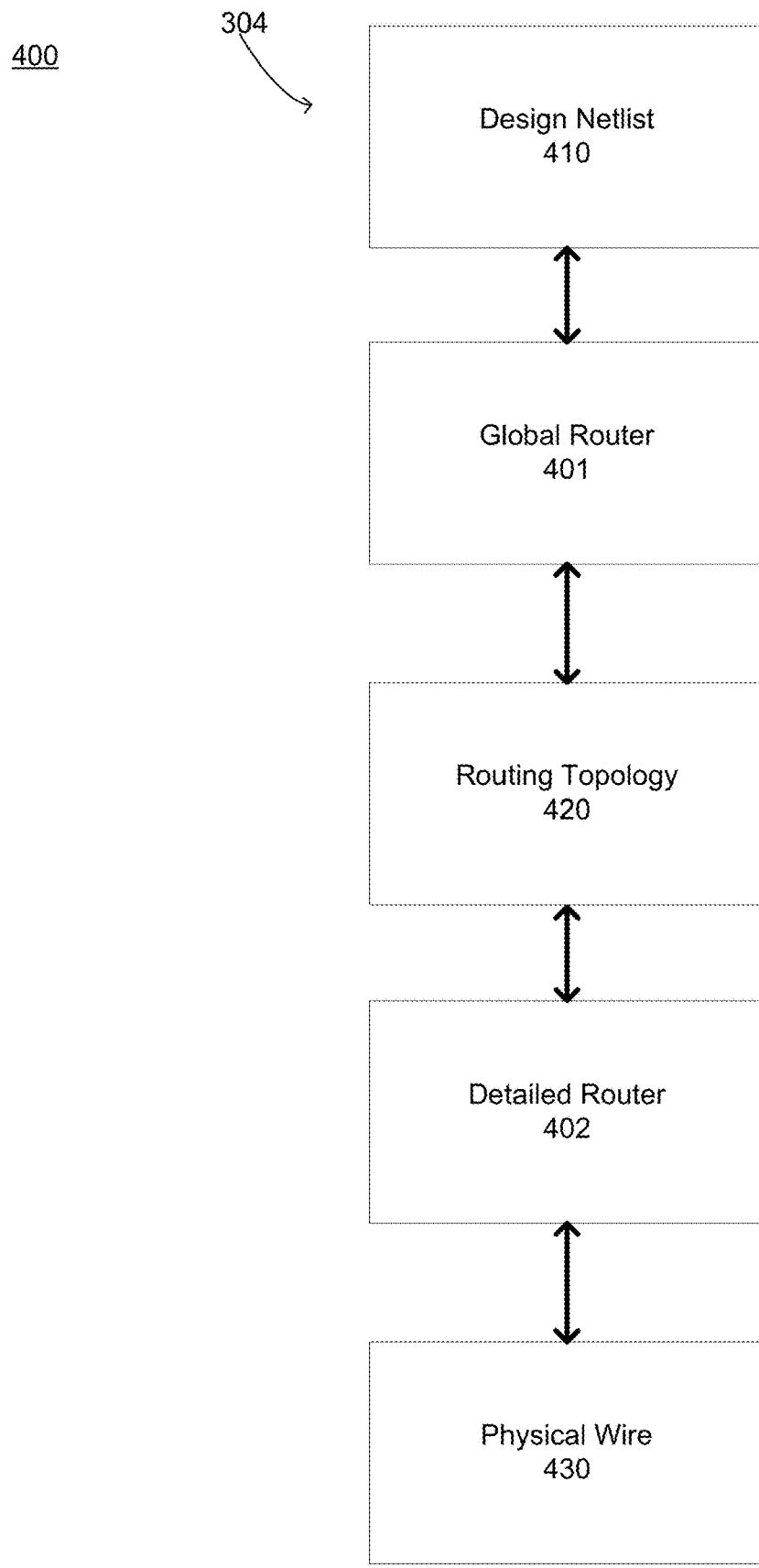
FIG. 4 is a block diagram illustrating functional components of a routing engine, which may be included as part of the router system consistent with the routing process of the present disclosure.

Referring now to FIG. 4, functional components of the routing engine 304 are illustrated, in accordance with some embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the routing engine 104 to facilitate additional functionality that is not specifically described herein.

Figure 2:
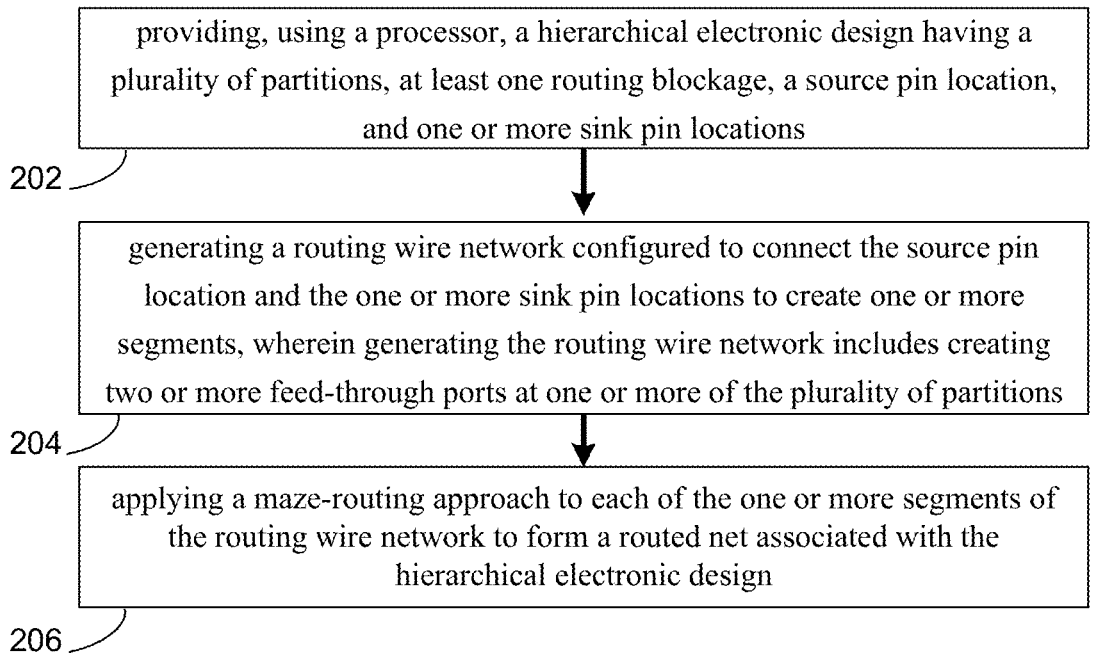
FIG. 2 is a flowchart depicting operations consistent with the routing process of the present disclosure.

Further, any one or more of the functional components illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Additionally, according to various example embodiments, any of the functional components illustrated in FIG. 2 may be implemented together or separately within a single machine, database, or device or may be distributed across multiple machines, databases, or devices.

As shown, the routing engine 304 comprises a global router 401 and a detailed router 402. A design netlist 410, which is provided as input to the global router 401, specifies connections of pins in one or more nets that may be included in an IC design. The global router 401 is responsible for determining an approximate routing path for wires connecting pins of each net in accordance with the design netlist 410 in a process referred to by those of ordinary skill in the art as "global routing." In doing so, the global router 401 may construct multiple levels, each with a global routing grid covering the entire IC design of one or more layers. At any one moment, only a portion, such as an area of one or more regions, of the design may be routed; therefore, much less memory and run time are required. In addition, since the routing task has been divided, multi-threaded parallelism can be applied to speed up the global router 401.

As shown, the global router 401 receives the design netlist 410 as input. The global router 401 processes the design netlist 410 to generate a routing topology 420 that includes a routing path for each net in the IC design that connects the net's routable elements. Each routing path may include multiple branches, each of which represents a wire that connects two pins. The routing topology 420 includes a topological graph that represents the IC design layout topologically. The topological graph may include a tree structure that includes several topological items including nodes that represent the pins in each net as well as the connections between each pair of pins.

Given the design netlist 410 as input, the global router 401 decomposes multi-pin nets in the design netlist 410 into two-pin nets. During the routing process, the global router 401 applies an entry-aware search algorithm to generate a single-entry-violation-free routing result for each two-pin net. The search algorithm may be "entry-aware" in that it penalizes multiple entries into a single partition (e.g., using an adjustment factor).

The routed two-pin nets are combined to assemble the multi-pin net. Although the individual two-pin nets are routed in a manner that does not violate the single-entry constraint, the single-entry constraint may be violated in the routed multi-pin net as a result of combining the two-pin nets. Accordingly, after routing, the global router 401 applies a post fix stage to remove extra entries for the multi-pin nets that violate the single-entry constraint. To fix the single-entry violation for a multi-pin net, a main partition entry is selected, and branches in the routing path that enter partitions at a point other than the selected main entry are ripped up. Next, the global router 401 sets a small routing cost to the selected main entry and the global router 401 applies the entry-aware search algorithm to reroute the ripped-up branches.

Figure 5:
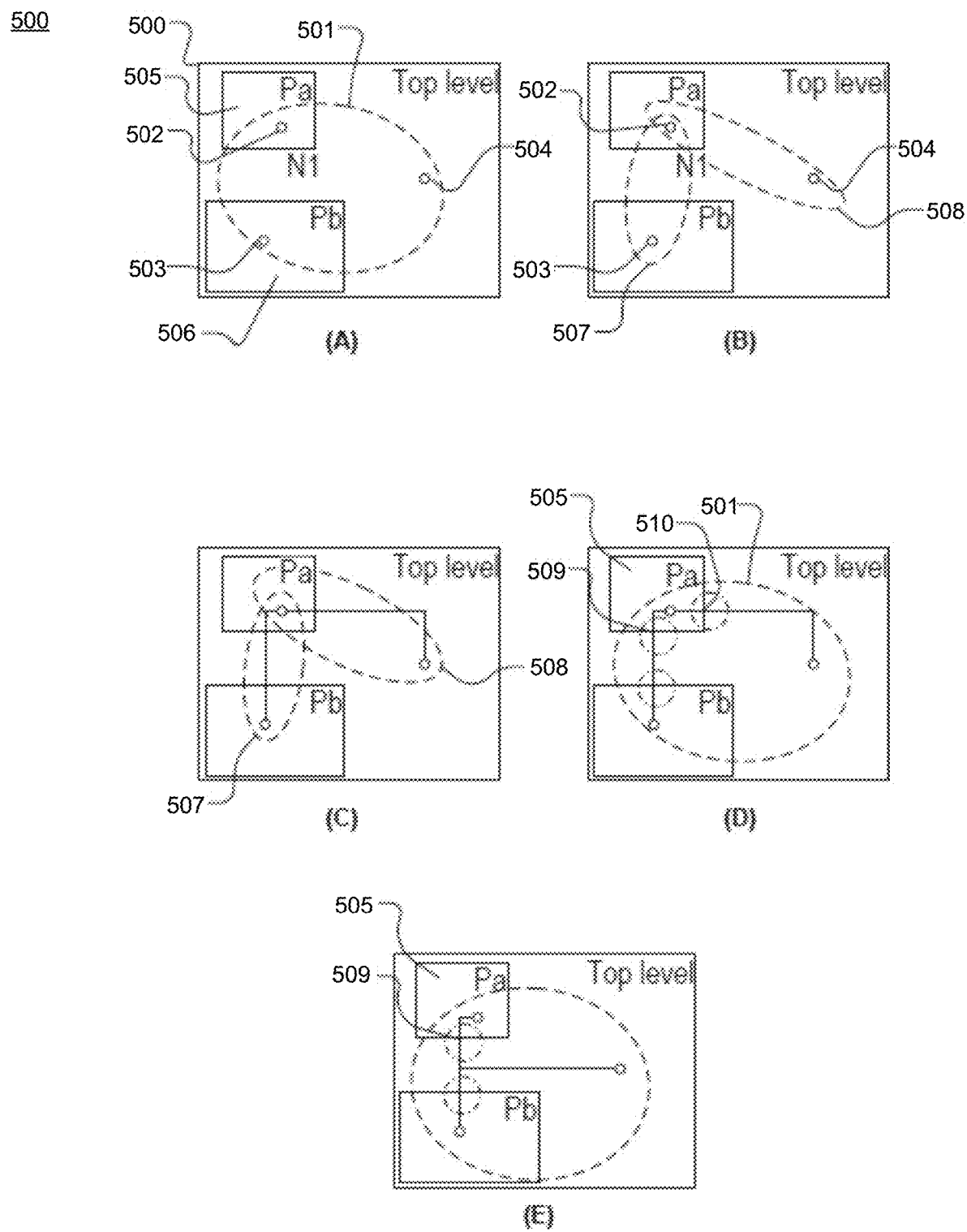
FIG. 5 is a conceptual diagram illustrating a high-level overview of a routing method performed by the routing engine for resolving single-entry constraint violations in IC designs consistent with the routing process of the present disclosure.

As an example, FIG. 5 is a conceptual diagram that illustrates a high-level overview of a routing method performed by the routing engine 304 for resolving single-entry constraint violations in IC designs, according to some example embodiments. Shown at FIG. 5(a) is a representation of an IC design 500. The IC design 500 comprises a multi-pin net 501 that includes pins 502-504 and partitions 505 and 506. As shown in FIG. 5(b), the multi-pin net 501 is decomposed (e.g., by the global router 401) into two-pin nets 507 and 508. Two-pin net 507 includes pins 502 and 503 and two-pin net 508 includes pins 502 and 504. As shown in FIG. 5(c), each of the two-pin nets 507 and 508 are individually routed. As mentioned above, the global router 401 routes the two-pin nets 507 and 508 using an approach based on modifications to the A* search algorithm. In particular, the A* search algorithm is modified to penalize multiple entries into a single partition. As an example of the foregoing, in routing each two-pin net, the global router 401 identifies each possible routing path, and selects, from the possible routing paths, a routing path that minimizes a routing score function that includes an adjustment factor that penalizes partition entries to minimize the partition entry count of the selected route. As shown, the routing paths used to connect two-pin nets 507 and 508 are single-entry-constraint-violation free.

As shown in FIG. 5(d), the routed two-pin nets 507 and 508 are combined to once again form the multi-pin net 501. However, although the routing results for the two-pin nets 507 and 508 are single-entry-constraint-violation free, the combination of the two-pin nets 507 and 508 creates multiple single entry constraint violations in the routed multi-pin net 301. For example, the partition 505 includes two entries entry 509 for the connection between pins 502 and 503 and entry 510 for the connection between pins 502 and 504. Accordingly, as shown in FIG. 5(e), the routing paths that violate the single entry constraints are ripped up and rerouted to share a common main entry point, thereby abiding by the single-entry constraint. In particular, the connection of the routing path that entered the partition 505 at entry 510 (e.g., the connection between pins 502 and 504) has been ripped up and rerouted to share the entry 509, which is the main entry selected for the partition 505.

Returning to FIG. 4, the routing topology 420 is passed to the detailed router 402, which generates physical wires 430 that realize the routing topology 420. To generate the physical wires 430 that realize the refined routing topology 420, the detailed router 402 routes the complete design by dividing the entire design into a set of smaller areas and/or partitions. Consistent with some embodiments, the detailed router 402 can route these areas in parallel utilizing multi-threaded parallel computing capabilities. In other embodiments, the detailed routing can be single-threaded all or some of the time, and/or multi-threaded all or some of the time.

Referring now to FIGS. 6-23, embodiments of routing process 10 that may be configured to provide a routing method for both single-entry and feed-through topologies in hierarchical designs are provided. As discussed above, in a hierarchical design, routing process 10 may be directed towards net routing across partition boundaries through ports. To ensure signal integrity, timing and cost of manufacturing, connection pins inside a partition should be connected to one single port, which may be referred to herein as a logical port. Restriction of connecting pins in a partition with only one logical port may be called single-entry constraint.

Since a partition may be large, simply honoring the single-entry constraints discussed above means that net routing would involve long detour around partitions that the net is not connecting to. Accordingly, routing process 10 may include feed-through routing as a method to overcome this problem. Using a feed-through routing approach a wire may be routed across a partition without connecting any pin in the partition. In a feed-through routing topology, a feed-through wire segment of a partition may involve at least two feed-through ports, which includes one feed-through entry port and one or more feed-through exit ports.

In existing systems, if a designer is given a list of partitions in hierarchical structure, the locations of a source pin and one or more sink pins (where a pin could be in any partition or out of the partition) generating a routing topology is extremely difficult. Conventional routing methods do not consider single-entry routing and feed-through routing at the same time. Moreover, using a conventional routing method for this problem would result in multiple logical ports. For example, if there is just a single-entry constraint, a conventional router could enforce a single entry port and still possibly provide a valid result. When feed-through routing is supported, the router could not strictly prohibit single entry. In such case it could not guarantee all pins inside the partition only connect to only one of the entries. Accordingly, embodiments of routing process 10 may be configured to generate such a routing topology, as well as connected logical and feed-through port locations, such that all pins are connected, single-entry constraints are satisfied, and all feed-through related routing rules are honored.

Figure 6:
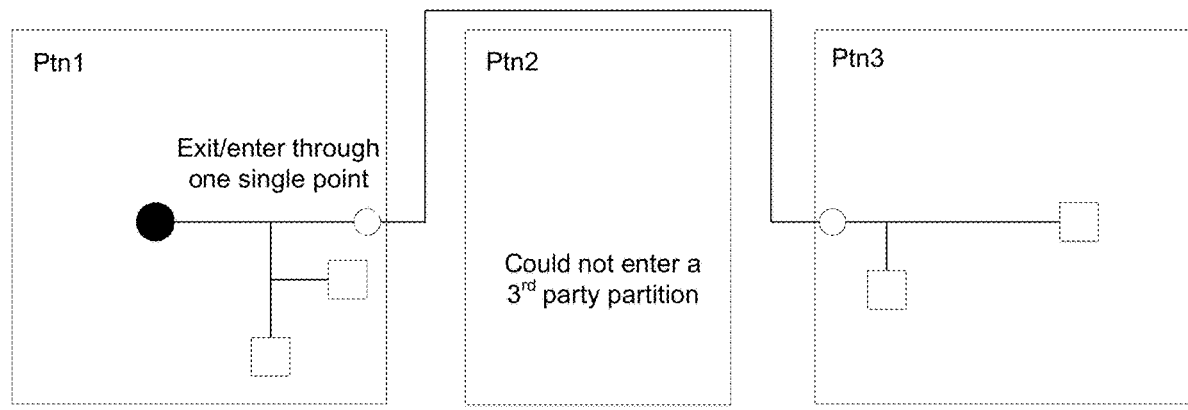
FIG. 6 is a conceptual diagram illustrating a high-level overview of a routing method performed by the routing engine for resolving single-entry constraint violations in IC designs consistent with the routing process of the present disclosure.
Figure 6:
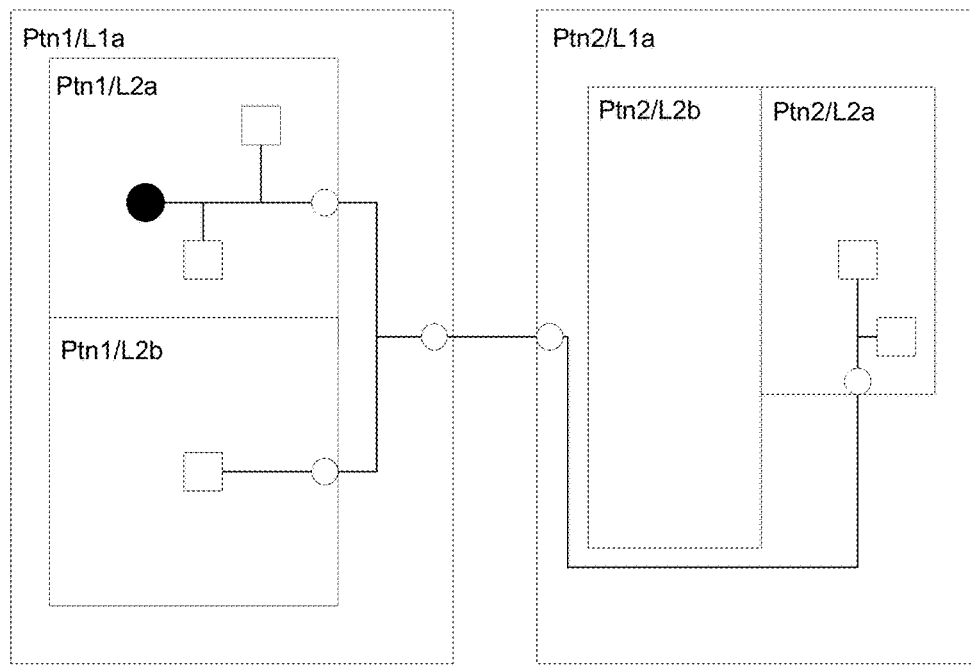
Figure 6:
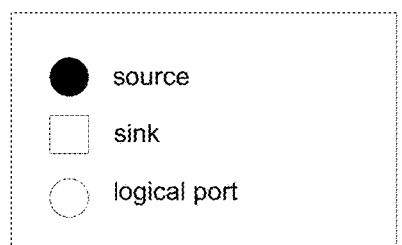

Referring now to FIG. 6, an embodiment showing a diagram 600 depicting routing with a single-entry constraint similar to those above is provided. FIG. 6 depicts two particular examples of routing with a single-entry constraint. As shown in the Figures, each example includes a source, one or more sinks, and a plurality of logical ports. The first example includes three partitions (e.g., ptn1-ptn3) and the second example includes two partitions (e.g. ptn1-ptn2). Routing wires of a net could only cross a partition's boundary only once (through a logical port), when there is any pin in the partition. For each net, at most one logical port may be created for each partition. When there is no pin in a partition, no logical port can be created.

Figure 7:
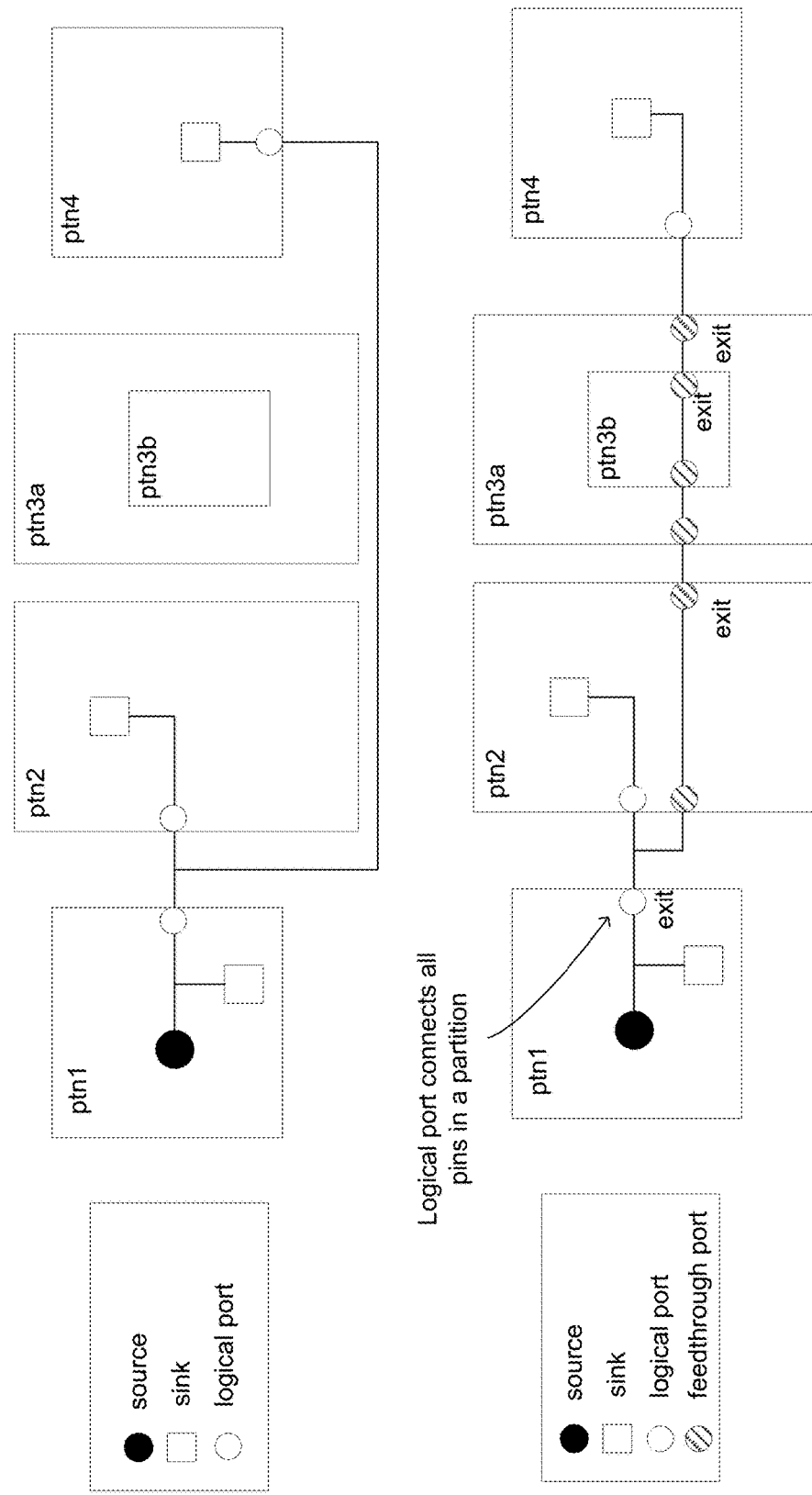
FIG. 7 is a conceptual diagram illustrating a high-level overview of a routing method performed by the routing engine for performing feed-through routing in IC designs consistent with the routing process of the present disclosure.
Figure 8:
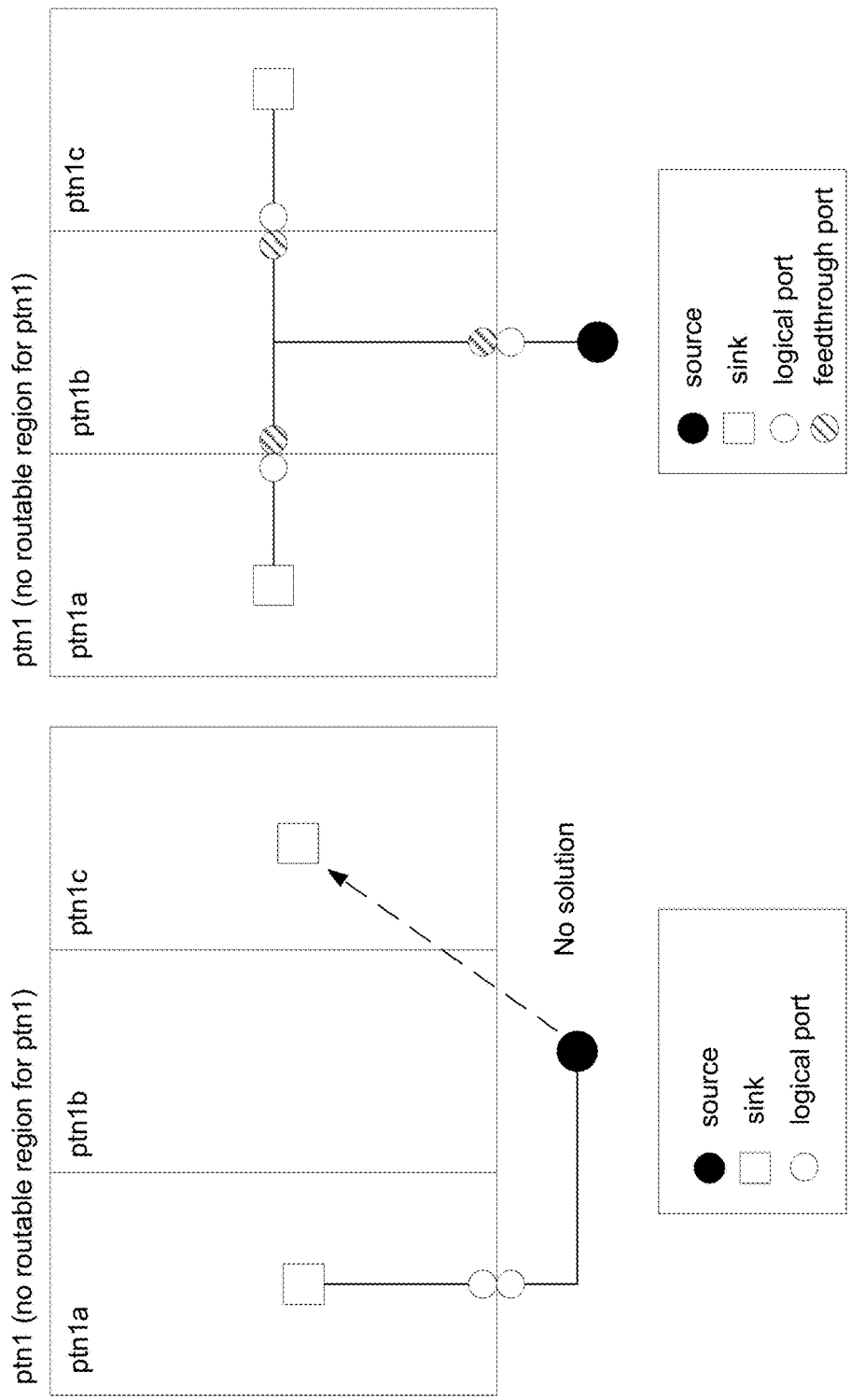
FIG. 8 is a conceptual diagram illustrating a high-level overview of a routing method performed by the routing engine for performing feed-through routing in IC designs consistent with the routing process of the present disclosure.

Referring now to FIG. 7, an embodiment of routing process 10 showing a diagram 700 depicting feed-through routing is provided. Diagram 700 includes four distinct partitions (e.g., ptn1-ptn4). In this example, the wire may be routed across a partition to achieve a shorter routing wire. Feed-through ports may be created at entry and exit of the feed-through wires. A partition could have multiple feed-through wire segments for a net. FIG. 8 shows three sub-partitions (e.g., ptn1a-ptn1c) with no mutable region for ptn1. Embodiments of routing process 10 may be configured to generate one or more feed-through ports in order to enable routing from ptn1a to ptn1b and ptn1c.

Figure 9:
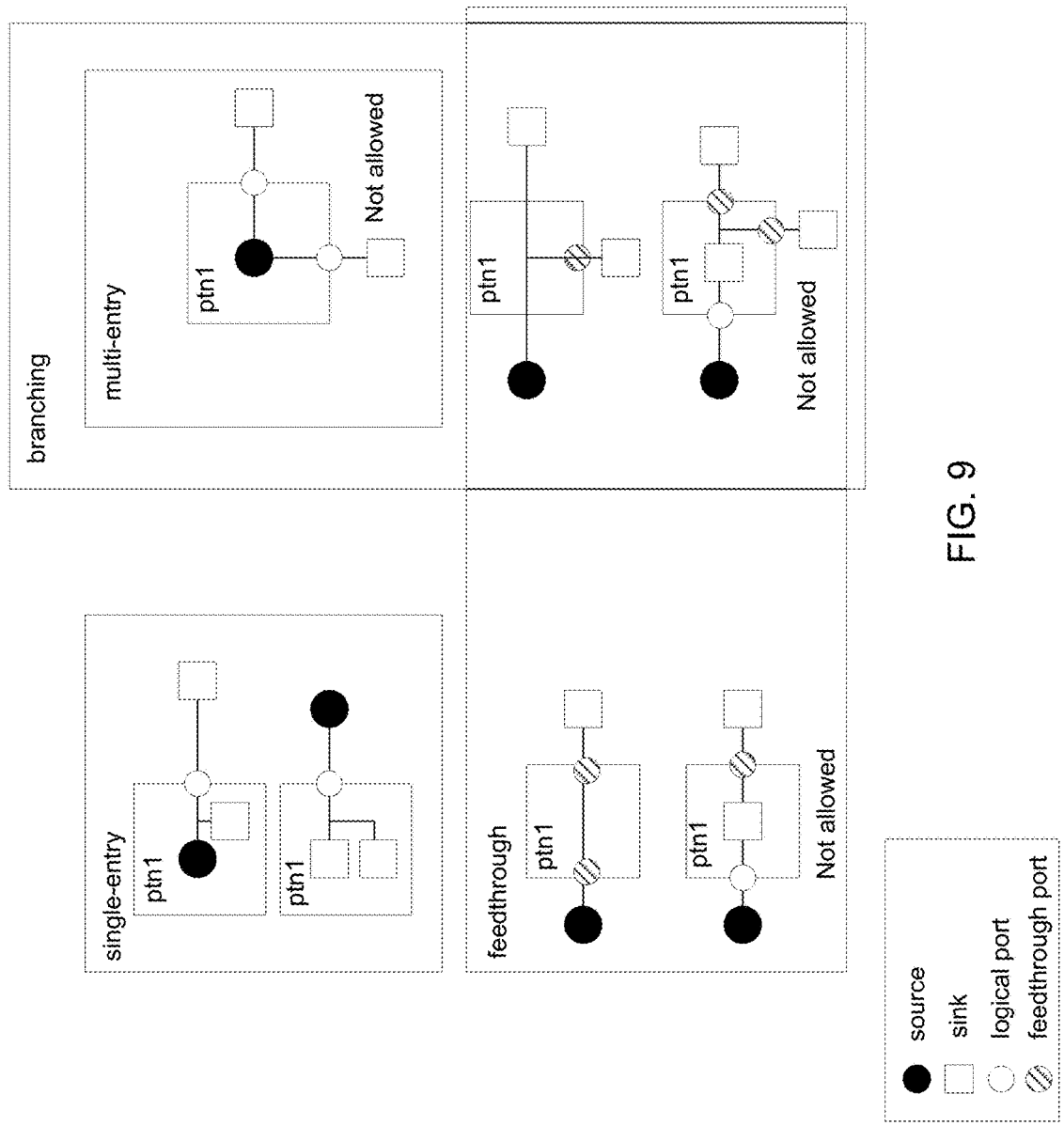
FIG. 9 is a conceptual diagram illustrating routing structure types consistent with the routing process of the present disclosure.

Referring now to FIG. 9, an embodiment of routing process 10 depicting various types of routing structures that may be employed is shown. As shown, some routing structures may include, but are not limited to, single entry (e.g. single logical exit port, single logical entry port, etc.), multi-entry (e.g., multiple logical exit port, which is generally not permitted), feed-through (e.g. simple feed-through, logical feed-through (also generally not permitted), and branching.

Figure 10:
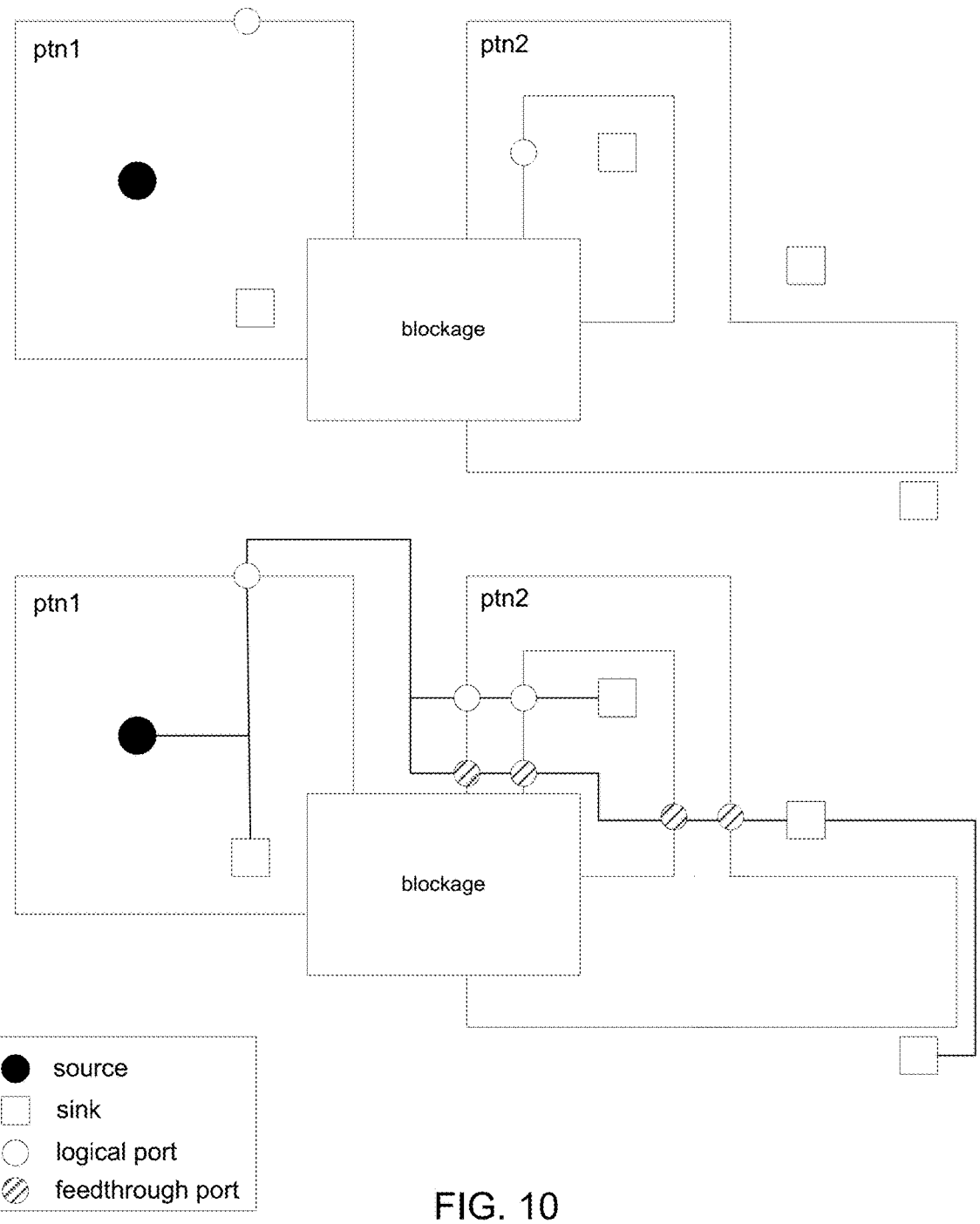
FIG. 10 is a conceptual diagram illustrating a high-level overview of a routing problem that may be addressed with the routing process of the present disclosure.

Referring now to FIG. 10, an embodiment of routing process 10 showing a diagram 1000 depicting an example of the problem and a possible solution using feed-through routing is provided. Diagram 1000 shows a list of partitions and their hierarchical structure. For each partition, a rectilinear continuous routing region, a label to indicate feed-through is supported, and/or an optional pre-defined logical port may be provided. A list of routing blockages, a source pin's location, and/or one or more sink pins' location may also be provided.

In some embodiments, with some or all of this information, routing process 10 may be configured to generate a routing wire network such that the source and all sinks are connected and the single-entry constraint is satisfied. Using the teachings of the present disclosure routing process 10 may utilize the feed-through approaches described herein to achieve a shorter total wirelength. Some possible net topologies may include, but are not limited to, single logical exit port, single logical entry port, simple feed-through, simple feed-through with branching, etc.

Figure 11:
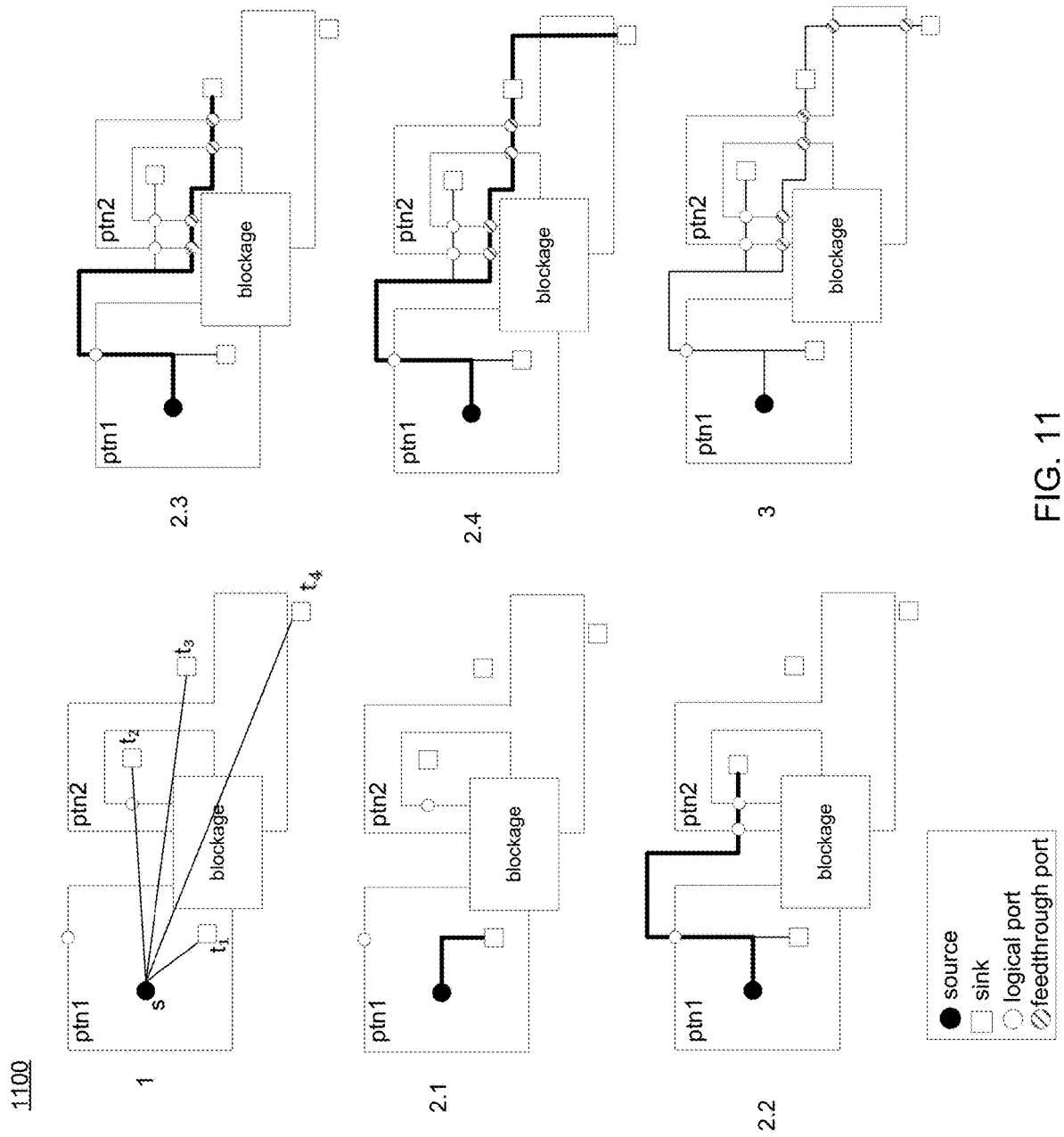
FIG. 11 is a conceptual diagram illustrating a high-level overview of a routing method performed by the routing engine for performing feed-through routing in IC designs consistent with the routing process of the present disclosure.

Referring now to FIG. 11, an embodiment of routing process 10 showing a diagram 1100 including a hierarchical design. In this example, one or more multi-pin nets may be decomposed into multiple two-pin nets as shown in step 1. For each net with n sinks, each two-pin segment of the net may be inserted to connect one of the sinks to the source. The minimal number of partition boundaries that need to be crossed for each segment routing may be estimated, and segments of a net may be sorted with these numbers. For each segment in a sorted order, maze routing may be performed to find a shortest path from the sink to source as is shown in steps 2.1-2.4 before the routed segments may be combined to form a routed net as shown in step 3.

In some embodiments, routing process 10 may utilize a cost propagation phase associated with maze routing. Here, routing process 10 may decide whether the propagation is allowed or not, based upon, at least in part, some or all of the following types of information: the partition it is propagating from, the partition it is propagating to, the hierarchical relationship of the two partitions it is propagating between, whether the source pin or the sink pin is in the partition it is propagating to or from, whether there is a logical or feed-through port allocated at where it is propagating, and/or whether there is any logical or feed-through port allocated somewhere else in this partition, etc. In the propagation phase, the propagation direction control may restrict the trace back solution to be single-entry valid while permitting feed-through.

In some embodiments, during a trace back phase of the maze routing, a valid routing path will be found. By adding this routing path to the net, it will satisfy the single-entry constraint for the net while feed-through routing could be involved to achieve better total wirelength.

Figure 12:
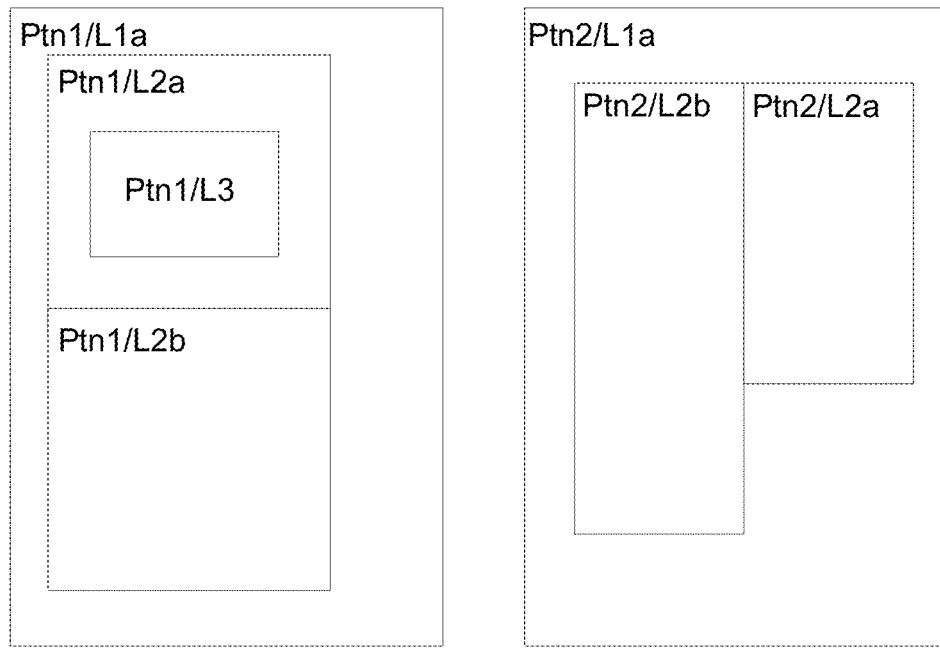
FIG. 12 is a conceptual diagram illustrating a high-level overview of a hierarchy of partitions consistent with the routing process of the present disclosure.
Figure 12:
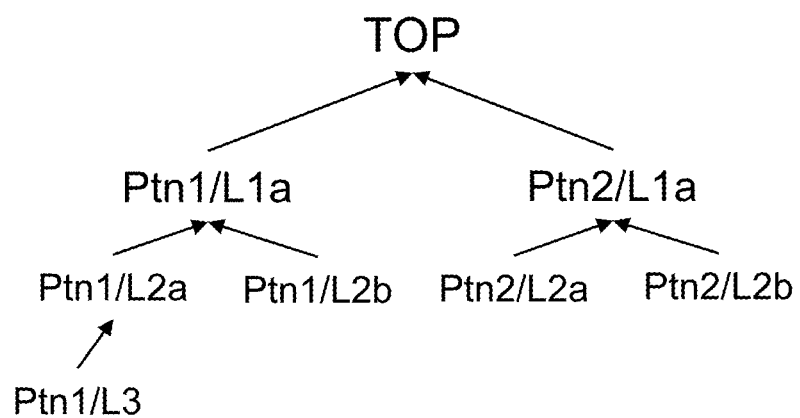

Referring now to FIG. 12, an embodiment of routing process 10 depicting a hierarchy of partitions is provided. As shown in the Figure, a partition could have any number of children partitions. In some embodiments, a virtual TOP partition may be defined internally to cover the entire design. All of the nets may be enclosed inside of the TOP partition and no wire may be routed out of the TOP partition. All of the partitions except TOP partition have one parent partition and the TOP partition has no parent partition. In some embodiments, the hierarchy of partitions can be represented as a tree structure as shown in FIG. 12.

Figure 13:
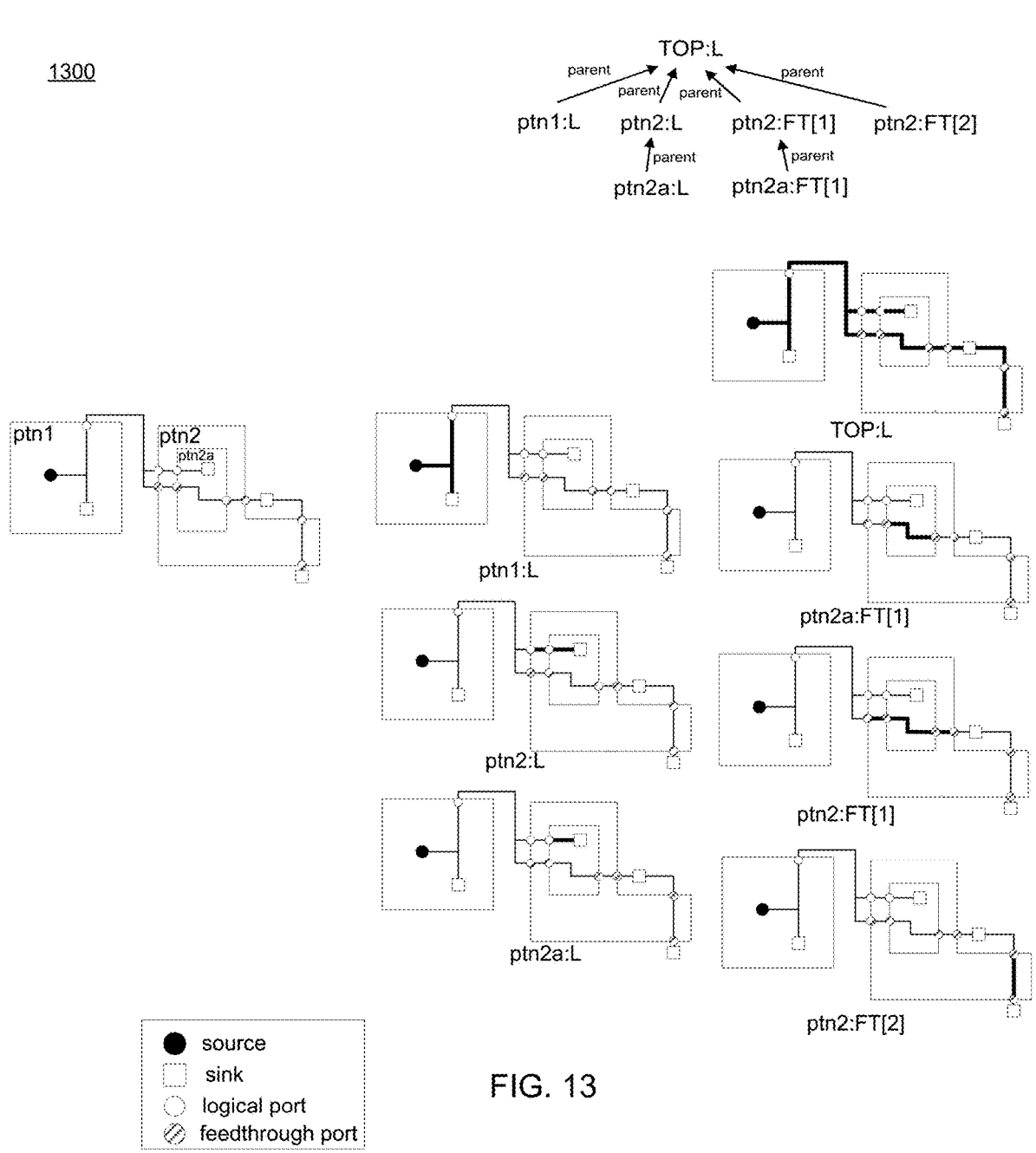
FIG. 13 is a conceptual diagram illustrating a high-level overview of a hierarchy of wire segments consistent with the routing process of the present disclosure.

Referring now to FIG. 13, an embodiment of routing process 10 depicting a hierarchy of wire segments is provided. As shown in the Figure, a logical wire segment may refer to a set of wires connecting the source and/or sinks and a logical port inside a partition. One partition has at most one logical wire segment. For example, a logical wire segment is shown in ptn1:L of FIG. 13.

In some embodiments, a feed-through wire segment may refer to a set of wires connecting the two or more feed-through ports. Here, a partition could include more than one feed-through wire segment. A wire segment w_1 could be covered by other wire segments. Among all those wire segments covering w_1, the shortest one, for example, w_2 is the parent of w_1. In this particular example, examples of feed-through wire segments are shown in ptnb2a:FT[1] and ptn2:FT[1]. In some embodiments, the longest wire may correspond to the parent (e.g. TOP1:L).

Figures 14A, 14B:
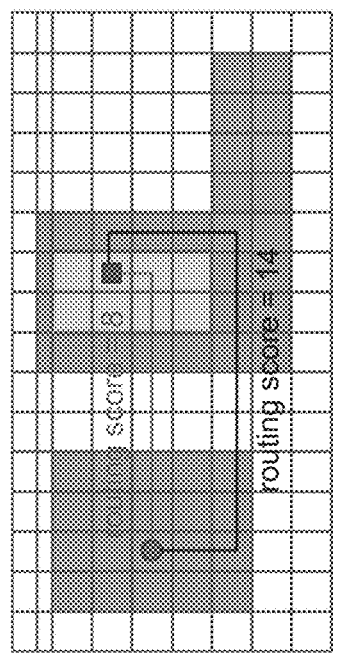
FIG. 14 is a conceptual diagram illustrating a high-level overview of a maze routing method consistent with the routing process of the present disclosure.

Referring now to FIG. 14, an embodiment of routing process 10 showing a routing grid graph 1400 that may be used in accordance with a maze routing methodology is provided. The routing grid graph may include a two-dimensional grid graph structure having grid cells (G) connected with grid edges (E). Each grid cell may be connected to four other grid cells in different directions with grid edges. Each grid edge may connect to two neighbor grid cells horizontally or vertically, which may be labeled with a constant routing score as shown in FIG. 14(a). In some embodiments, each grid cell may be labeled with a variable accumulated routing score (s), a parent grid cell (p), which indicates where does the score come from, and/or a partition number (ptn) as shown in FIG. 14(b).

Figure 15:
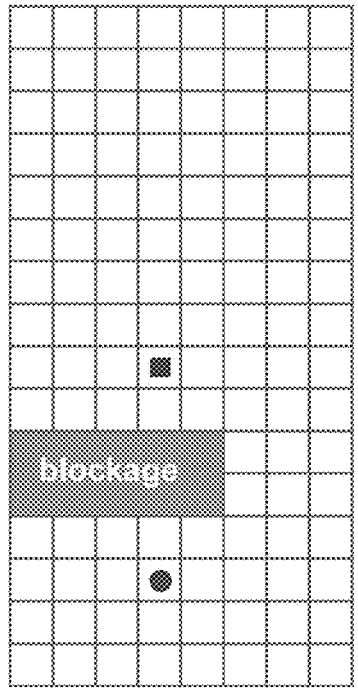
FIG. 15 is a conceptual diagram illustrating a high-level overview of a maze routing method consistent with the routing process of the present disclosure.
Figure 15:
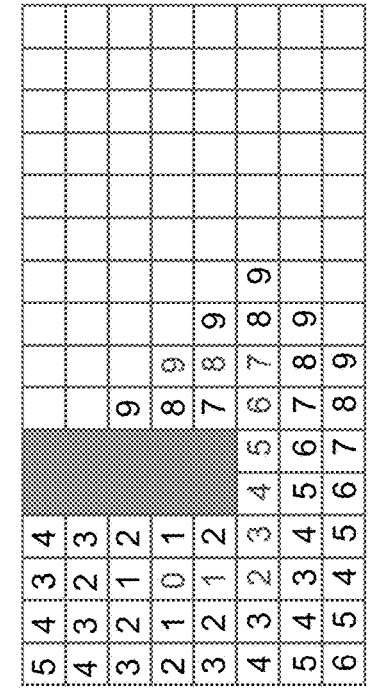
Figure 15:
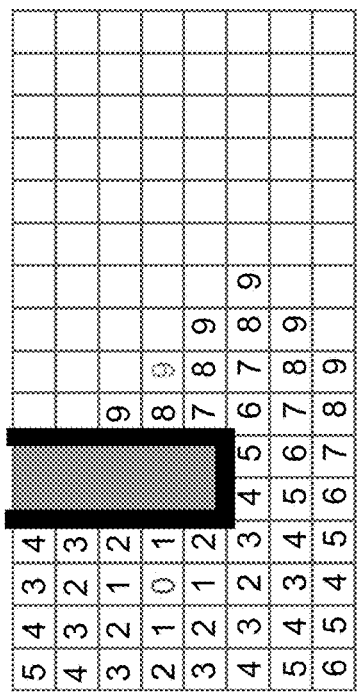

Referring now to FIG. 15, an embodiment of routing process 10 showing an example maze routing procedure is provided. As shown in FIG. 15, given a particular routing problem, the process may include score propagation and traceback of a path.

Figure 16:
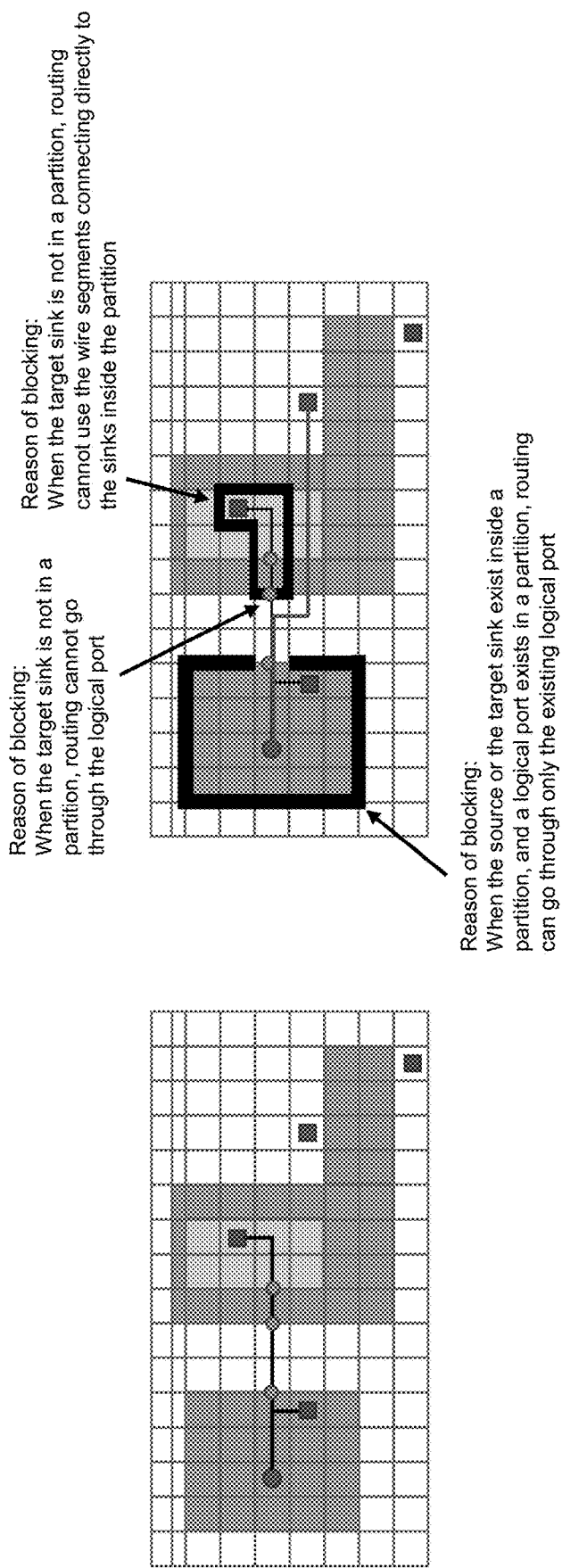
FIG. 16 is a conceptual diagram illustrating a high-level overview of a maze routing method consistent with the routing process of the present disclosure.

Referring now to FIG. 16, an embodiment of routing process 10 showing another example maze routing procedure is provided. The process may be configured to handle single-entry and feed-through routing with maze routing. The process may conditionally block score propagation based upon, at least in part, one or more of the permitted routing structure of the partitions, existing routing wires in the same net, existing routing ports in the same net, etc.

Figure 17:
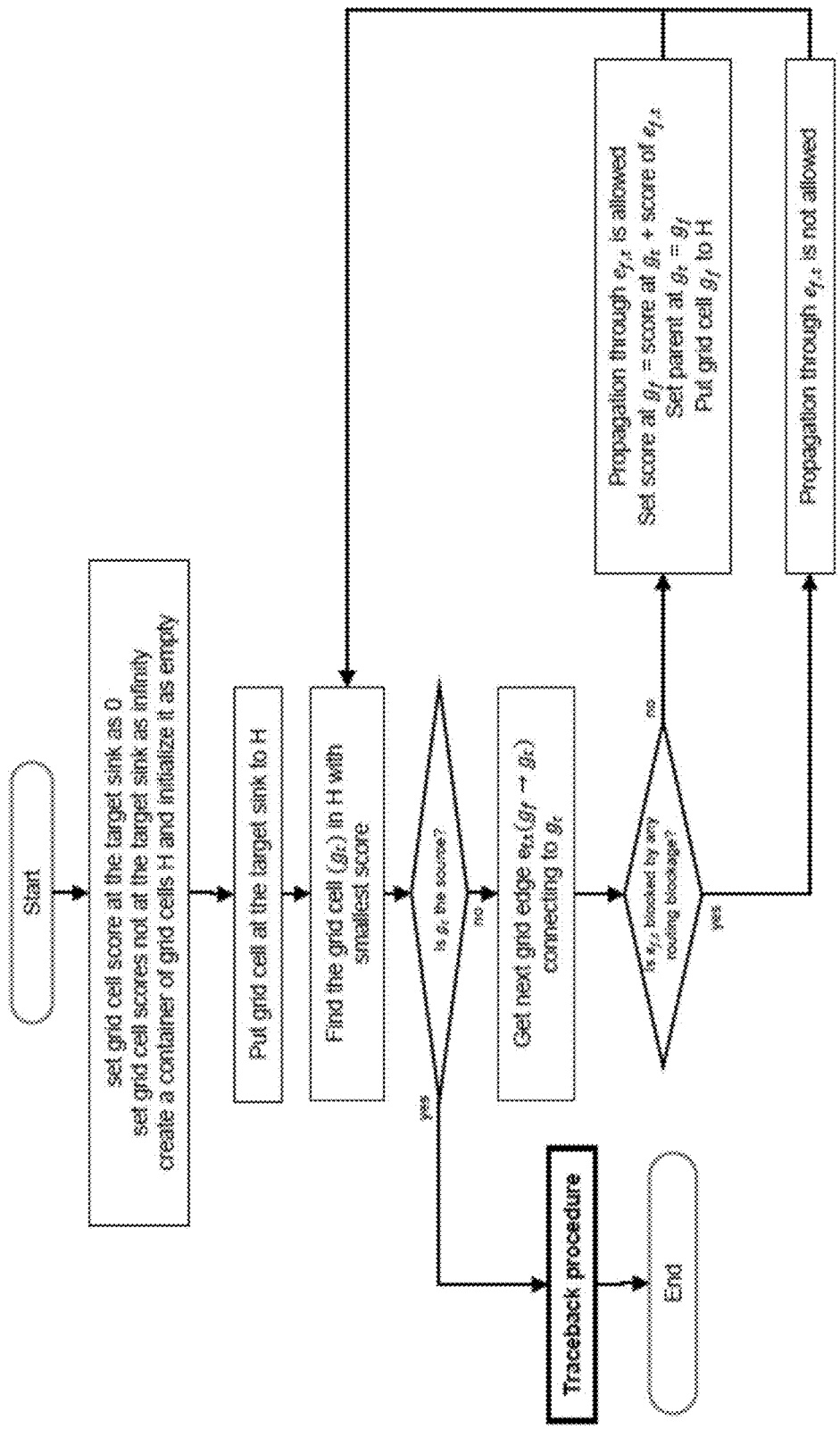
FIG. 17 is a flowchart depicting operations consistent with a maze routing process.
Figure 18:
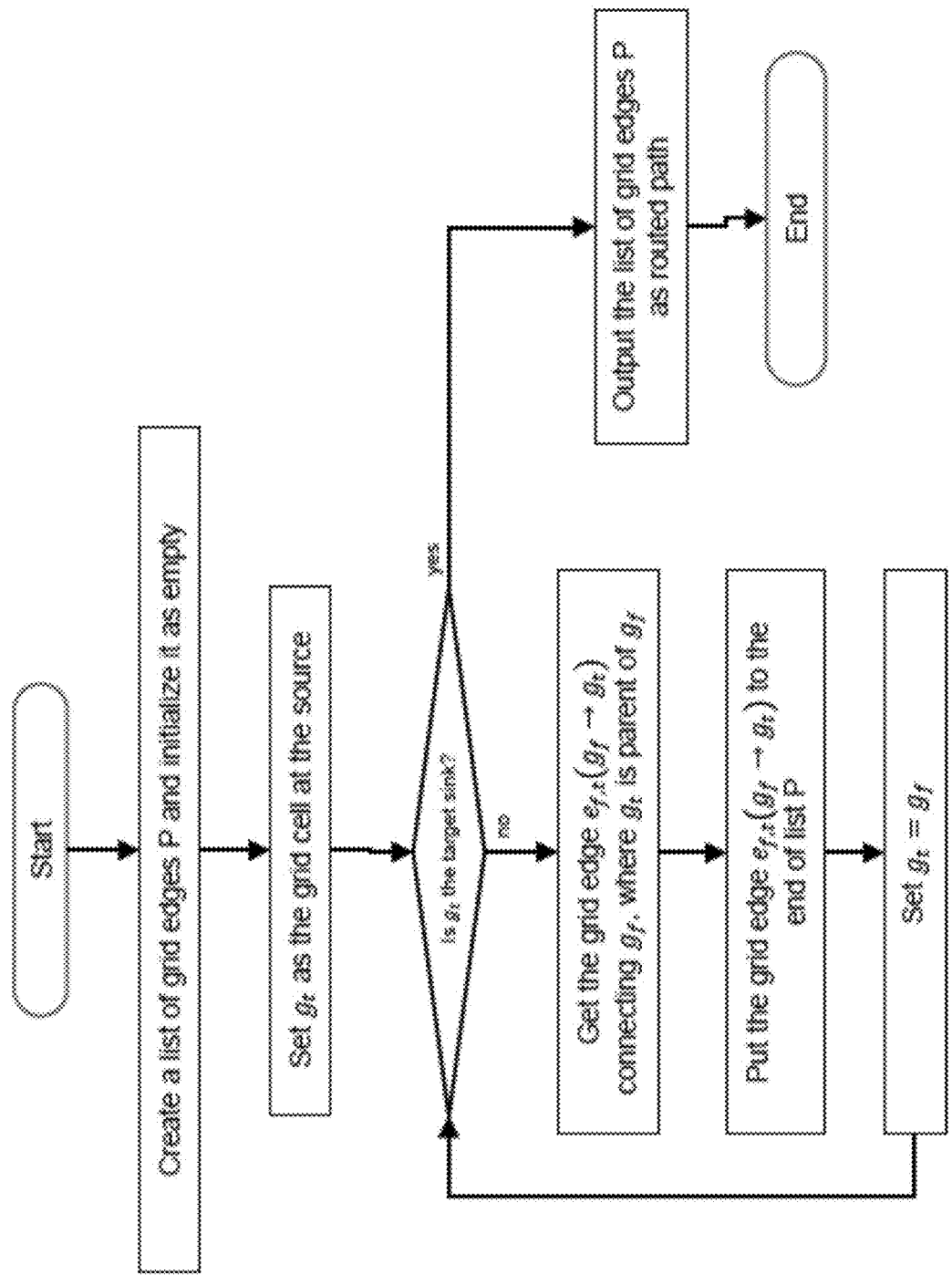
FIG. 18 is a flowchart depicting operations consistent with a traceback process.
Figure 19:
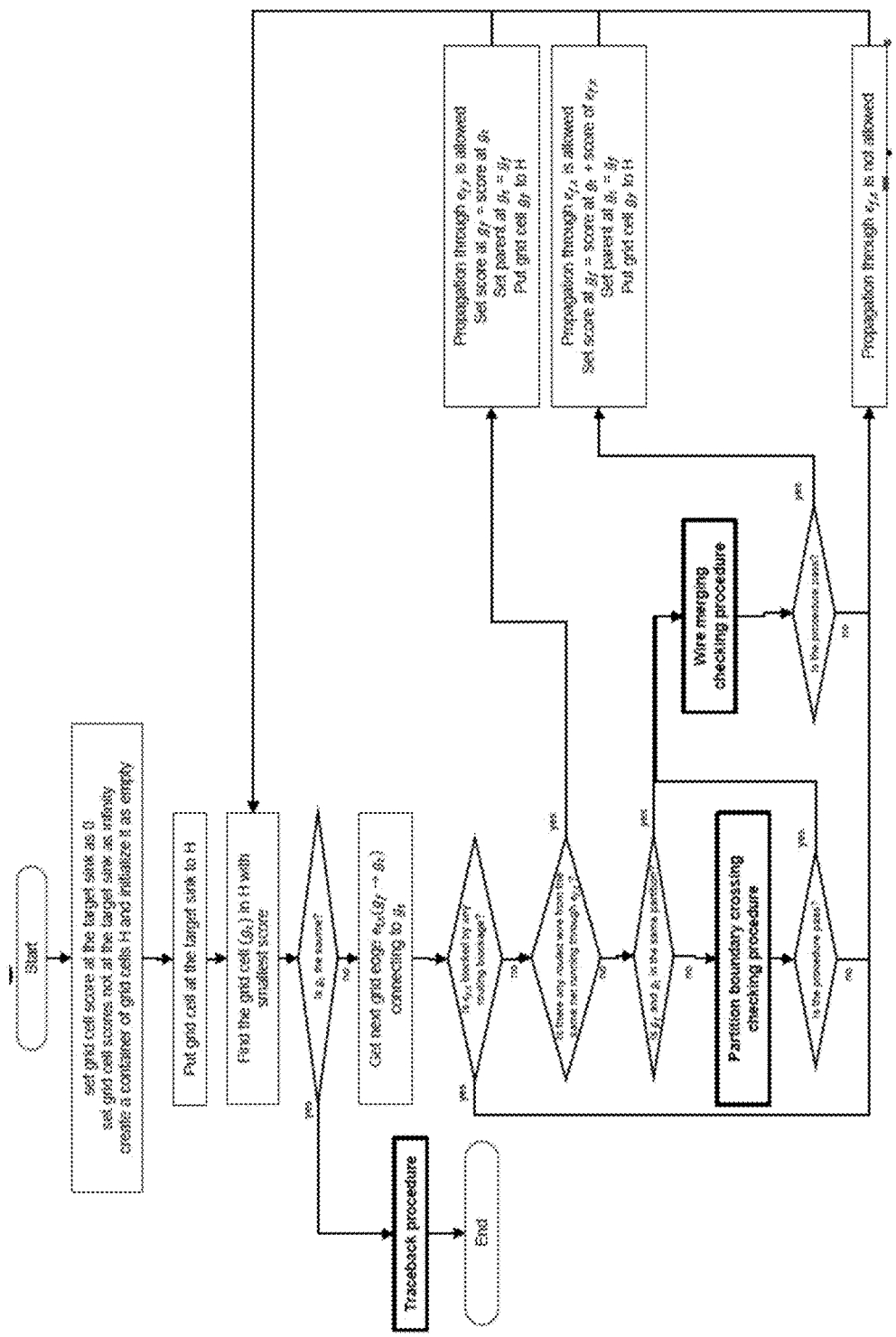
FIG. 19 is a flowchart depicting operations consistent with the routing process of the present disclosure.
Figure 20:
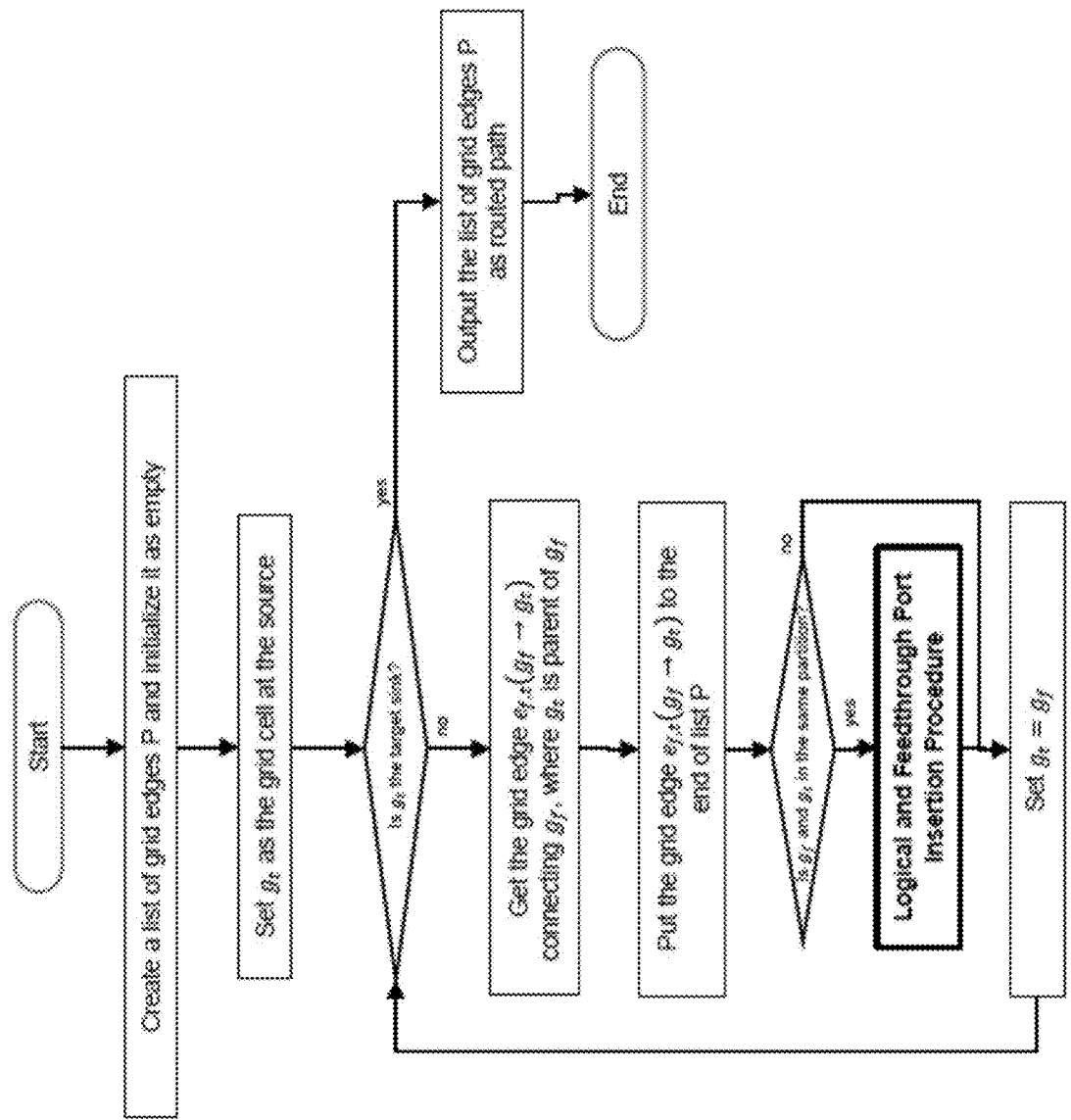
FIG. 20 is a flowchart depicting operations consistent with the routing process of the present disclosure.
Figure 21:
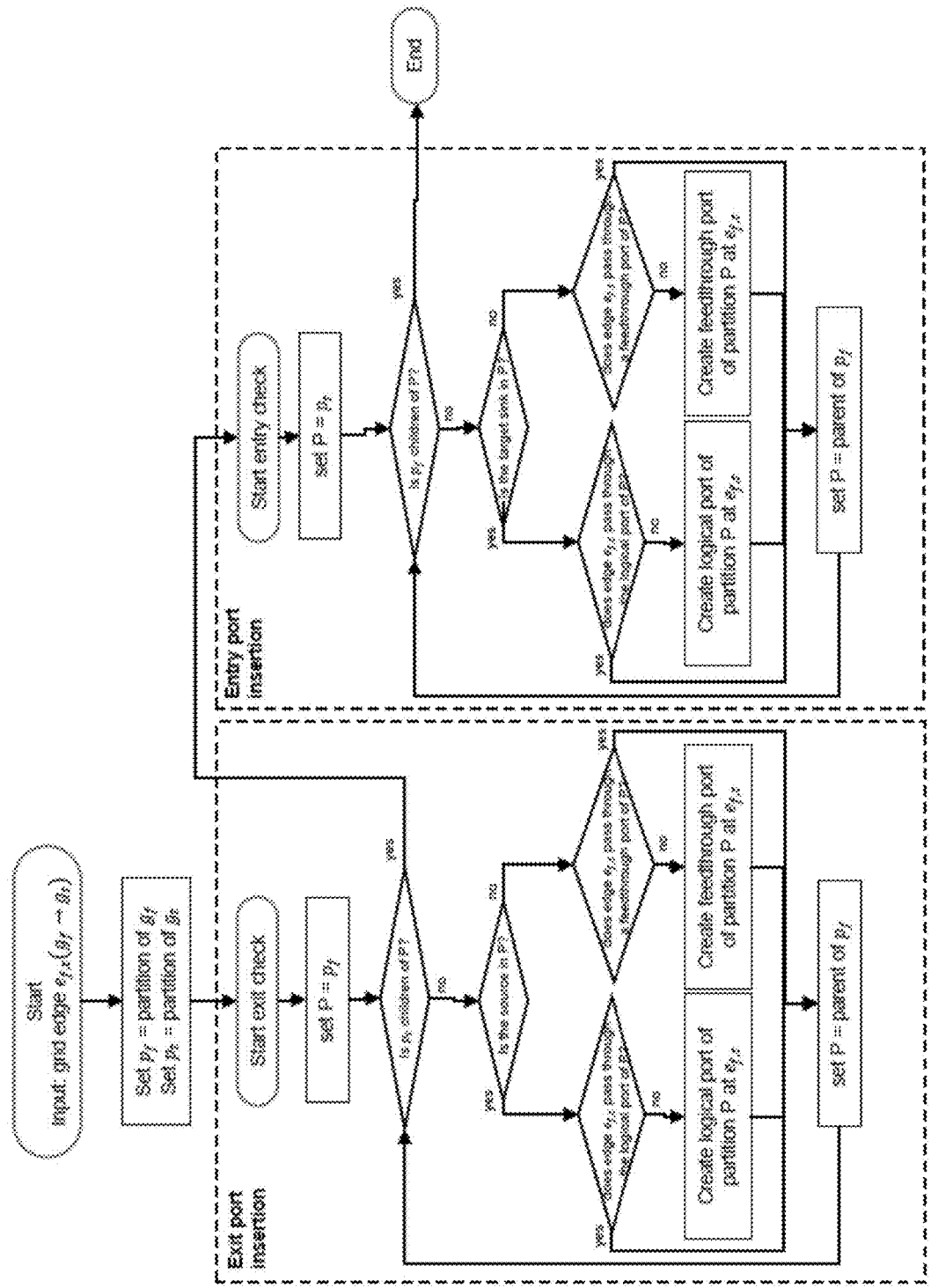
FIG. 21 is a flowchart depicting operations consistent with the routing process of the present disclosure.
Figure 22:
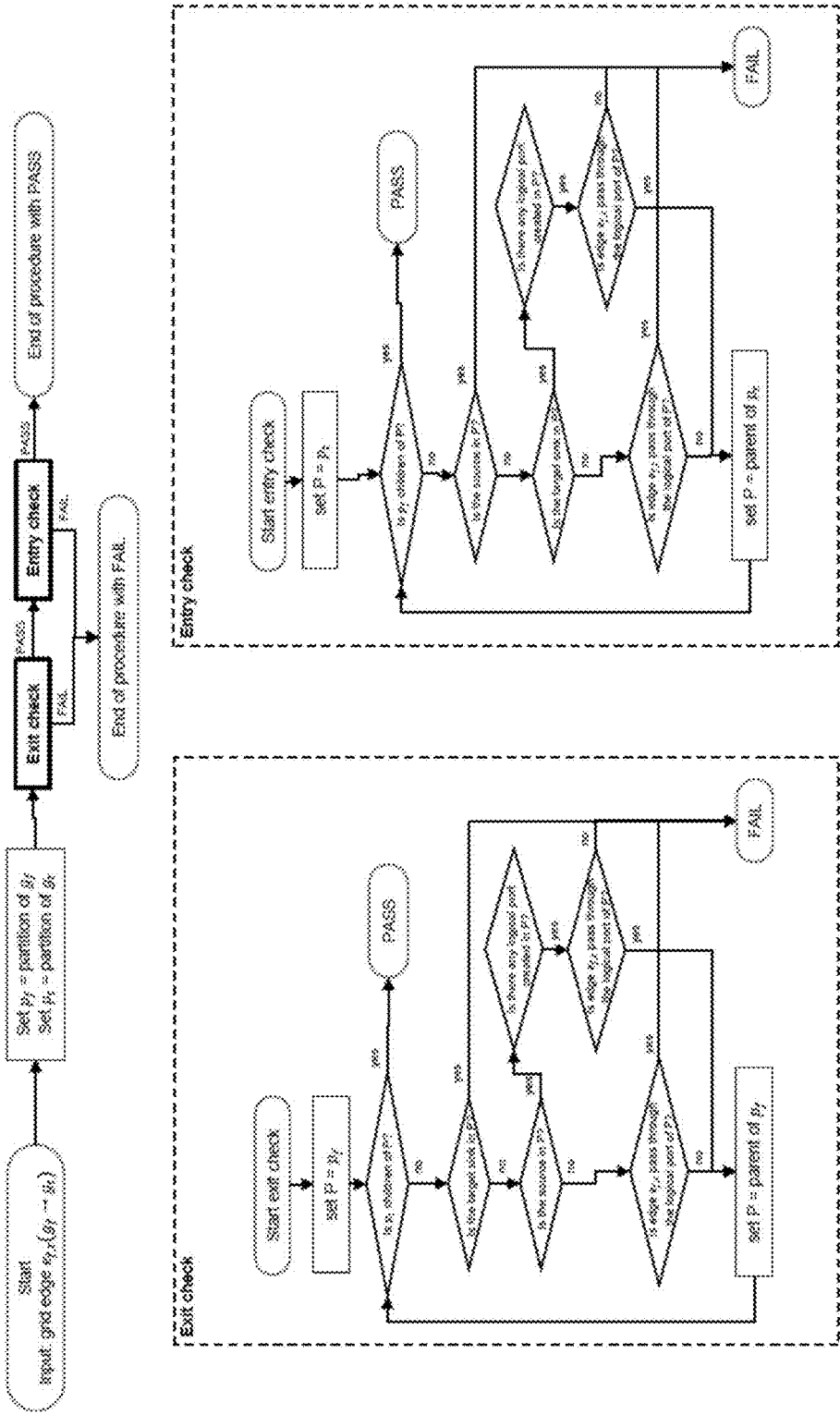
FIG. 22 is a flowchart depicting operations consistent with the routing process of the present disclosure.
Figure 23:
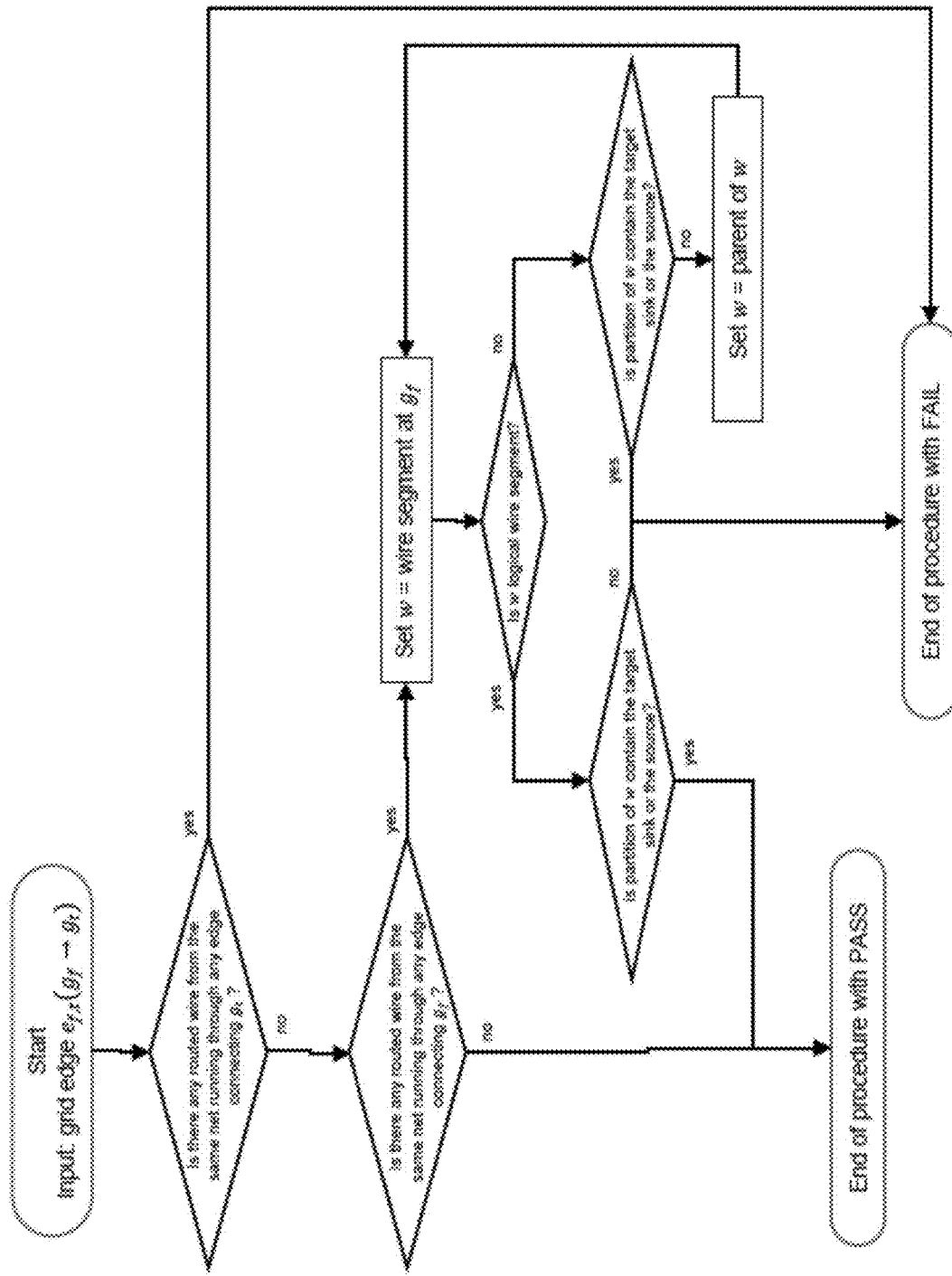
FIG. 23 is a flowchart depicting operations consistent with the routing process of the present disclosure.

Referring now to FIGS. 17-18, examples of typical maze routing and traceback procedures are provided. In contrast, FIGS. 19-20 show examples of maze routing and traceback procedures consistent routing process 10 and embodiments of the present disclosure. As can be seen in FIGS. 19-23, routing process 10 includes new traceback procedures (FIG. 20), new logical and feed-through port insertion procedures (FIG. 21), new partition boundary crossing checking procedures (FIG. 22), and/or new wire merging checking procedures (FIG. 23), etc.

Accordingly, embodiments of routing process 10 may provide numerous advantages over existing approaches. Some of these may include, but are not limited to, a modified maze routing method to support single-entry and feed-through routing topologies, the definition of a wire segment hierarchy, which may allow the maze routing method to efficiently checks the propagation validity, a procedural method of checking the validity of maze routing propagation across partition border(s), a procedural method of inserting logical ports and feed-through ports correctly, etc. Current conventional routing methods or traditional maze routing methods do include propagation control considering feed-through topology and single-entry constraint as discussed herein.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with nixed-language, mixed-signal, and low-power designs, across multiple levels of abstraction, and may include the ability to "hot swap" the RTL, simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system" Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for routing in an electronic circuit design comprising:
   providing, using a processor, a hierarchical electronic design having a plurality of partitions, at least one routing blockage, a source pin location, and one or more sink pin locations;
   generating a routing wire network configured to connect the source pin location and the one or more sink pin locations to create one or more segments, wherein generating the routing wire network includes creating two or more feed-through ports at one or more of the plurality of partitions; and
   applying a maze-routing approach to each of the one or more segments of the routing wire network to form a routed net associated with the hierarchical electronic design, wherein the maze-routing approach is configured to support both feed-through routing and single-entry routing at the same time, wherein feed-through routing includes routing a wire across the one or more of the plurality of partitions without connecting any pin in the partition.

2. The computer-implemented method of claim 1, further comprising:
   determining a logical wire segment associated with each of the plurality of partitions.

3. The computer-implemented method of claim 2, further comprising:
   determining a feed-through wire segment connecting the two or more feed-through ports.

4. The computer-implemented method of claim 3, further comprising:
   determining a wire segment hierarchy based upon, at least in part, the logical wire segment associated with each of the plurality of partitions and the feed-through wire segment connecting the two or more feed-through ports.

5. The computer-implemented method of claim 1, further comprising:
   validating the maze-routing approach across a border of each of the plurality of partitions.

6. The computer-implemented method of claim 1, further comprising:
   determining an appropriate placement for the two or more feed-through ports at one or more of the plurality of partitions.

7. A non-transitory computer-readable storage medium having stored thereon instructions that when executed by a machine result in the following operations:
   providing, using a processor, an electronic design having one or more partitions, at least one routing blockage, a source pin location, and one or more sink pin locations;
   generating a routing wire network configured to connect the source pin location and the one or more sink pin locations to create one or more segments, wherein generating the routing wire network includes inserting at least one feed-through port at one or more of the plurality of partitions; and
   applying a maze-routing procedure to each of the one or more segments of the routing wire network to form a routed net associated with the hierarchical electronic design, wherein the maze-routing approach includes a partition boundary crossing checking procedure and a wire merging checking procedure, wherein the maze-routing approach is configured to support both feed-through routing and single-entry routing at the same time, wherein feed-through routing includes routing a wire across the one or more of the plurality of partitions without connecting any pin in the partition.

8. The computer-readable storage medium of claim 7, further comprising:
   determining a logical wire segment associated with each of the plurality of partitions and a feed-through wire segment connecting the two or more feed-through ports.

9. The computer-readable storage medium of claim 7, further comprising:
   displaying the routing wire network at a graphical user interface.

10. The computer-readable storage medium of claim 8, further comprising:
    determining a wire segment hierarchy based upon, at least in part, the logical wire segment associated with each of the plurality of partitions and the feed-through wire segment connecting the two or more feed-through ports.

11. The computer-readable storage medium of claim 7, further comprising:
    validating the maze-routing approach across a border of each of the plurality of partitions.

12. The computer-readable storage medium of claim 9, further comprising:

displaying, at the graphical user interface, the least one feed-through port at one or more of the plurality of partitions.

13. A system for evaluating a routing comprising:

a computing device having at least one processor configured to access a design netlist of an integrated circuit (IC) design, the design netlist identifying a multi-pin net and specifying connections between pins included in the multi-pin net, the IC design having two or more partitions, the at least one processor further configured to decompose, using the one or more hardware processors, the multi-pin net into a plurality of two-pin nets, the at least one processor configured to route each two-pin net of the plurality of two-pin nets, the routing of each two-pin net including inserting at least one feed-through port at one or more of the plurality of partitions to generate a routing wire network, wherein the at least one processor is further configured to apply a maze-routing procedure to each of one or more segments of the routing wire network to form a routed net associated with the hierarchical electronic design and wherein the maze-routing procedure is configured to support both feed-through routing and single-entry routing at the same time.

14. The system of claim 13, wherein the maze-routing procedure includes analyzing one or more routing grid graphs.

15. The system of claim 13, wherein the at least one processor is further configured to display the routing wire network at a graphical user interface.

16. The system of claim 13, wherein the at least one processor is further configured to determine a wire segment hierarchy based upon, at least in part, one or more of the logical wire segment associated with each of the plurality of partitions and the feed-through wire segment connecting the two or more feed-through ports.

17. The system of claim 13, wherein the maze-routing approach includes a partition boundary crossing checking procedure and a wire merging checking procedure.

* * * * *